US012339133B2

(12) United States Patent
Miller, Jr. et al.

(10) Patent No.: US 12,339,133 B2
(45) Date of Patent: Jun. 24, 2025

(54) IVI SYSTEM AND METHODOLOGY FACILITATING DISPLAY, RETRIEVAL, TRANSMISSION AND COMPUTATION OF ENHANCED EMERGENCY DATA ELEMENTS

(71) Applicant: Miller Analytics LLC, Germantown, TN (US)

(72) Inventors: Douglas Charles Miller, Jr., Germantown, TN (US); Jihyun Lee, Seoul (KR); Jeffrey Floyd Miller, Lebanon, OH (US)

(73) Assignee: Miller Analytics LLC, Germantown, TN (US)

( * ) Notice: Subject to any disclaimer, the term of this patent is extended or adjusted under 35 U.S.C. 154(b) by 381 days.

(21) Appl. No.: 17/727,738

(22) Filed: Apr. 23, 2022

(65) Prior Publication Data

US 2023/0341233 A1    Oct. 26, 2023

(51) Int. Cl.
| | | |
|---|---|---|
| G06F 17/00 | (2019.01) | |
| G01C 21/36 | (2006.01) | |
| H04W 4/90 | (2018.01) | |

(52) U.S. Cl.
CPC ..... *G01C 21/3617* (2013.01); *G01C 21/3614* (2013.01); *G01C 21/3638* (2013.01); *H04W 4/90* (2018.02)

(58) Field of Classification Search
CPC ............ G01C 21/3617; G01C 21/3614; G01C 21/3638; G01C 21/3682; H04W 4/90
USPC ........................................................ 701/533
See application file for complete search history.

(56) References Cited

U.S. PATENT DOCUMENTS

| | | | | |
|---|---|---|---|---|
| 10,386,195 | B1 * | 8/2019 | Grunberger | G01C 21/34 |
| 2004/0204837 | A1 * | 10/2004 | Singleton | G09B 29/007 701/410 |
| 2006/0184319 | A1 * | 8/2006 | Seick | G01C 21/28 340/995.19 |
| 2008/0208446 | A1 * | 8/2008 | Geelen | G01C 21/3655 715/764 |
| 2012/0109519 | A1 * | 5/2012 | Uyeki | B60L 53/68 701/426 |
| 2015/0066557 | A1 * | 3/2015 | Lichti | G06Q 10/06311 705/34 |
| 2015/0241235 | A1 * | 8/2015 | Lobato Fregoso | G01C 21/3697 701/423 |
| 2016/0274770 | A1 * | 9/2016 | Lovati | G06Q 50/26 |
| 2016/0275151 | A1 * | 9/2016 | Lovati | G06Q 10/06 |

(Continued)

*Primary Examiner* — Matthew Ell
*Assistant Examiner* — Matthew J Ludwig
(74) *Attorney, Agent, or Firm* — Shook, Hardy & Bacon L.L.P.

(57) ABSTRACT

An improved in-vehicle infotainment (IVI) system and methodology facilitating the display, computation, receipt and transmission of enhanced data elements and data files. System and methodology comprising an improved IVI system with an enhanced series of software and firmware capable of communicating with external data servers, processing enhanced protocols, transmitting data elements in report form with data attachments, and displaying the received enhanced data elements onto callout icons overlaid onto a GPS navigation interface. Additional system and methods include protocols for external servers to receive, encode, decode, compress, decompress, store, compute and transmit emergency reports and aggregate data files.

28 Claims, 25 Drawing Sheets

(56) References Cited

U.S. PATENT DOCUMENTS

| | | | |
|---|---|---|---|
| 2016/0284038 A1* | 9/2016 | Johnson | G16H 50/00 |
| 2019/0156646 A1* | 5/2019 | Richey | G08B 21/10 |
| 2019/0361437 A1* | 11/2019 | Wilson | G06F 40/58 |
| 2021/0381839 A1* | 12/2021 | Verbeke | G01C 21/3407 |
| 2022/0020491 A1* | 1/2022 | Martin | G16H 15/00 |

* cited by examiner

Figure 14

IVI SYSTEM AND METHODOLOGY FACILITATING DISPLAY, RETRIEVAL, TRANSMISSION AND COMPUTATION OF ENHANCED EMERGENCY DATA ELEMENTS

BACKGROUND

Emergency information dissemination during incidents of eminent danger is of extreme importance when occupants of a vehicle are experiencing a medical or other emergency. To preserve the golden time, defined as the unit of time required to safely rescue a person from the time of an accident, it's essential in terms of the survival of emergency patients to disseminate emergency data in real-time. Providing accurate real-time data elements to vehicle occupants, first responders and medical specialists is therefore essential in preserving the golden time.

Enhanced data elements facilitate users via the improved in-vehicle infotainment (IVI) system and methodology in a variety of emergency scenarios, such as finding a hospital with the shortest wait time or greatest capacity, finding the nearest fueling station from single-touch graphic iconography, transmitting in-vehicle emergency reports out to an alerting authority, scheduling a medical specialist via an appointment scheduler or viewing nearby vehicles by vehicle-to-vehicle (V2V) communication displayed onto the improved IVI system.

Advancements in wireless technology, along with improvements in data band-width are rapidly changing the landscape of emergency information dissemination. Digital transformation initiatives such as industry 4.0 enable disseminating, retrieval and transmission of enhanced data elements to vehicle occupants, first responders and medical specialists via the IVI system, during an emergency event. Combined with visual thinking techniques, such as single touch-screen iconography and color-coded callouts with embedded enhanced data element displays, vehicle occupants can process and expedite their real-time decision-making during moments of urgent duress.

Current IVI systems have yet to embrace the enhanced features capable with this digital transformation. Lacking from current IVI systems are integrated external networks along with systems and methodologies for vehicle occupants to receive, transmit and display enhanced real-time emergency data elements onto an IVI system display. Systems and methodologies like the automatic collision notification (ACN) stops short of pre-emptively assembling and transmitting a traffic accident emergency report with enhanced data elements including vehicle, person, crash, event data recorder (EDR) and camera data. High impact events often involve specialized investigative teams to manually remove or read a vehicle's EDR data elements. Some OEM manufacturers have propriety tools for reading EDR data elements, therefore causing delays in the investigation, if those tools are not readily available.

Additionally, an IVI system and methodology facilitating real-time emergency external data elements are missing from existing IVI system GUI displays. Easy to read, color-coded callout icons with embedded data elements and GPS pinpoints for emergency destinations such as hospitals, fuel stations, police departments and fire stations overlaid onto a GPS navigation interface has not been developed. IVI system displays also lack icons overlaid onto a display screen of the vehicle through a GPS navigation interface which identify nearby vehicles equipped with vehicle-to-vehicle (V2V) communication.

Additionally, current IVI systems lack a methodology to facilitate filtering medical appointment scheduling via a protocol for medical services and medical providers from a single touch-screen GUI menu. Therefore, current methodology to transmit external data elements such as the user-selected appointment time for a user defined medical provider is non-existent.

Furthermore, in emergency situations requiring in-vehicle navigation to a hospital, it becomes critical to make an informed decision in real-time. Choosing the hospital with the shortest wait times or the greatest open capacity is therefore essential. During the COVID-19 pandemic, many hospitals were over capacity and experiencing extraordinary wait times. For patients with existing comorbidities, missing the coveted golden time is a matter of life and death. Waiting inside an emergency room (ER) for hours on end to see the next available doctor may increase the probability of dying as a result of an existing comorbidity. Therefore, providing an IVI system GUI display of enhanced data elements to aid patients in making life altering real-time decisions is critical.

SUMMARY

Improved IVI systems and methodologies for vehicle occupants to receive, transmit, compute and display enhanced emergency data elements are described in detail herein. Embodiments enclosed represent the system infrastructure and process methodologies detailing receiving, transmitting, computing and displaying enhanced emergency data elements. The infrastructure, as presented in various embodiments detailed herein, can include an IVI system equipped with an emergency navigation software application that includes stored geographic pinpoints for police and fire stations, hospitals, schools and fuel stations, single-touch iconography from on-board memory, including but not limited to color-coded callouts compatible to display text in the form of emergency data elements overlaid onto a geographic street map.

Additionally, improved IVI system is equipped with a processor capable of computing distance and time from driven vehicle to stored pinpoints. Improved IVI system may also be enhanced with software applications including hospital data application, emergency reporting application and an appointment scheduler application, all working in conjunction with the emergency navigation application to receive, transmit and display enhanced emergency data elements.

Improved IVI system with hospital data software facilitates receiving emergency data elements emanating from a plurality of hospitals, including data elements such as hospital name, hospital wait time, hospital capacity, hospital medical specialties, available rooms, emergency room patients, doctors on call, in-network insurance, price or copay amount, doctor specialties and cafeteria availability. Infrastructure facilitating the hospital data software for the improved IVI system may also include an external aggregate server that supports the methodology to populate the callouts overlaid onto a display screen of vehicle through a GPS navigation interface with the received emergency data elements. Emergency data elements are received from a plurality of hospitals into the external aggregate server, whereby the data elements obtained from the external aggregate server is then transmitted to the improved IVI systems. IVI system GUI then displays emergency enhanced data elements into the color-coded callout display, overlaid onto a GPS navigation interface. Alternatively, a separate IVI system GUI display may present the emergency data elements into a character text field table, methodology is facilitated herein.

Furthermore, improved IVI system with emergency reporting software facilitates the transmission of emergency data elements for both automatic reporting of emergency events in high-impact vehicular accidents and manual reporting of emergency events via a pre-configured single-touch menu selection. Infrastructure facilitating the emergency reporting software for the improved IVI system also includes an external emergency routing server to support the methodology of attaching relevant emergency data elements obtained from the vehicle's CANBus network including, but not limited to vehicle data elements, person data elements, crash data elements, electronic data recorder (EDR) data elements, camera data elements or any other data obtained from a connected vehicle module. Transmission of emergency data elements may then be retrieved and routed out of the external emergency routing server to an alerting authority, whereby an emergency report is formally assembled with the emergency data elements transmitted.

Furthermore, improved IVI system with appointment scheduler software facilitates the transmission of emergency data elements via a pre-configured single-touch menu selection for medical services and medical providers for the user-selected medical specialty. Infrastructure facilitating the appointment scheduler software also includes an external appointment scheduler server to support the methodology of pointing user-selections directly to the medical service providers appointment scheduling system. Date and time appointment scheduling is then facilitated by the appointment scheduler server obtaining available appointment openings from the medical specialist's appointment server. Availability is relayed back to the supporting appointment scheduler server, which then transmits the availability onto a user selectable IVI system GUI display.

Various processes and protocols enclosed, as presented in various embodiments facilitate the improved IVI system and methodology as detailed herein. Starting with the emergency navigation protocol that estimates route distance and drive time, derived from the difference between the GPS coordinate positioning of the driven vehicle and the static emergency location pinpoints stored on improved IVI system memory.

Protocols facilitating improved IVI system hospital data software include an emergency hospital protocol for an external aggregate server to assemble hospital aggregate data into a single file format, with data elements including but not limited to real-time hospital capacity, hospital available rooms, wait time, emergency room patients, doctors on-call, in-network insurance, doctor specialties on-call and cafeteria availability. Additional protocols facilitating the hospital data software includes an aggregate server protocol for an external server to compile, compress and encode data elements transmitted from the aggregate server and a hospital filter protocol, whereby the improved IVI system filters by hospital specialty from system memory.

Protocols facilitating improved IVI system emergency reporting software include an emergency report protocol for the IVI system to retrieve an emergency report from the IVI system memory, which recognizes the type of emergency report manually selected from the IVI system GUI or automatically determines the emergency report from in-vehicle data elements. Automatic emergency report in some embodiments, may be generated for pre-defined data element thresholds, including but not limited emergency events including airbag deployment, rapid change in elevation, rapid change in acceleration, increased gravitational (G)-force readings, etc. Subsequent data elements read from the IVI system memory or data collected from the vehicle CANBus network then populate the enhanced data element fields of the emergency report.

Additional equipment and protocols to facilitate emergency reporting software include an external emergency routing server and a protocol to receive and process the vehicle's GPS coordinates for determining a local jurisdiction, based on geo-coordinates from a file located on the improved IVI system memory, whereby the emergency report is then transmitted out to the local jurisdiction's dispatch server.

Protocols facilitating an improved IVI system appointment scheduler software include an appointment protocol to receive GPS coordinates from the vehicle and output a pre-configured GUI menu of medical specialties then computing nearby medical specialists based on the vehicle GPS coordinates for the medical specialist selected.

Protocols facilitating an improved IVI system emergency navigation V2V protocol retrieves vehicle icons with callout from IVI system memory overlaid onto a geographic street map, computes distance from driven vehicle to nearby vehicles and receives and displays nearby vehicle information from V2V communication into the callout icon.

BRIEF DESCRIPTION OF THE DRAWINGS

FIG. 14 is a mockup of an IVI system GUI display of a traffic accident emergency report with person data elements in tabular format.

DETAILED DESCRIPTION

Figure 1:
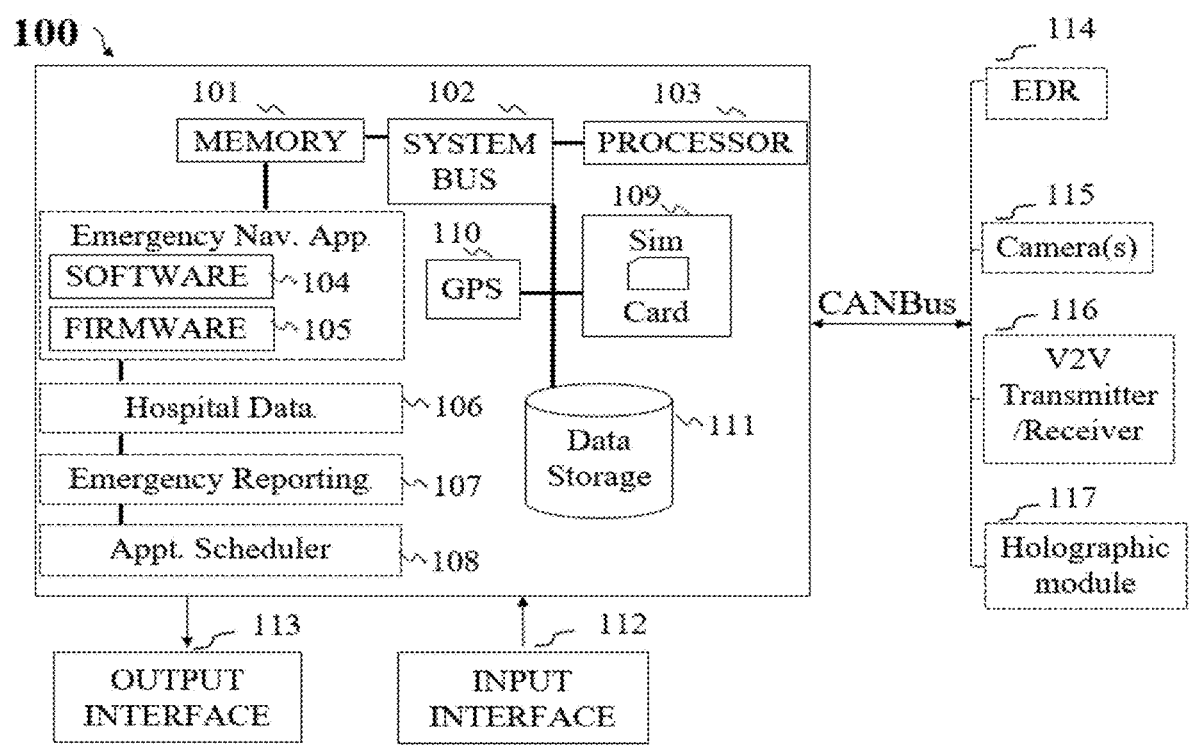
FIG. 1 is a functional block diagram of an improved IVI system equipped with the emergency navigation application, hospital navigation application, emergency reporting application and appointment scheduler application facilitating a plurality of enhanced displays and functionality.

The following detailed description illustrates exemplary embodiments by way of example for the present disclosure herein. The improved IVI system with emergency navigation software, hospital data software, emergency reporting software and appointment scheduler software is now described with reference to the drawings, wherein like reference numerals are used to refer to like elements throughout.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary"

is intended to mean serving as an illustration or example of something, and is not intended to indicate a preference.

Further, as used herein, the term "computing device" is intended to include an IVI system, mobile phone, tablet, laptop or any other electronic device equipped with computer-readable storage capable of facilitating the systems and methodologies detailed herein, that when acted upon by a user input causes the stored computer-executable protocols to run via a processor and output a visual display of emergency data elements.

Further, as used herein, the term "improved IVI system" is intended to be inclusive for all computing devices facilitating the systems and methodologies in-full or in-part as disclosed herein. Rather than an exclusive system or methodology, unless specified otherwise, "improved IVI system" employs an inclusive system and methodology with natural permutations which may facilitate the functionality as detailed herein.

Furthermore, as used herein, the terms "emergency navigation software", "hospital data software", "emergency reporting software", "appointment scheduler software", "emergency navigation application", "hospital data application", "emergency reporting application" and "appointment scheduler application" are intended to be inclusive terms for facilitating the "improved" systems and methodologies detailed herein. It is hereby recognized with natural permutations some or all of the terms may be encompassed into an "improved IVI system". That is, the term "improved IVI system" may employ any combination of individual software terms and is satisfied by any of the following instances: "improved" employs A; "improved" employs B; "improved" employs C; "improved" employs D; or "improved" employs both A, B, C and D.

In addition, the articles "a" and "an" as used in this application and the appended claims should generally be construed to mean "one or more" unless specified otherwise or clear from the context to be directed to a singular form.

Further, as used herein, the term "node" refers to a computer or similar device located at an individual hospital or medical center facilitating receiving and transmitting data elements in the form of hospital name, static hospital GPS coordinates, hospital patient capacity as a percentage, total available rooms, hospital estimated wait time, number of emergency room patients, doctors on call, in-network insurance availability, price per visit, doctor specialties available and cafeteria availability.

total emergency room patients, total doctors on call, in-network insurance for user, doctor specialties on call and cafeteria availability.

Further, as used herein, the term "hospital aggregate data" refers to non-personal identifiable data emanating from real-time hospital location specific aggregate data in the form of patient capacity as a percentage, total available rooms, estimated wait times, total emergency room patients, total doctors on call, in-network insurance for user, doctor specialties on call and cafeteria availability.

Referring now to FIG. 1, an illustration of an exemplary improved in-vehicle infotainment (IVI) system 100 that can be used in accordance with the systems and methodologies disclosed herein is illustrated. The improved IVI system 100 includes memory 101 which executes stored instructions for implanting functionality described as being carried out by one or more components discussed above. Data received from the system bus 102 is processed by at least one processor 103 that executes instructions that are stored in memory 101. Instructions for implementing functionality described as being carried out by one or more components discussed above or instructions for one or more of the methods described above that are carried out by either the emergency navigation software 104 or firmware 105. Emergency navigation software 104 or firmware 105 may additionally include any combination of programed applications as detailed herein.

Additionally, in some embodiment's software enhancements functioning in conjunction with the emergency navigation software 104 or firmware 105 may be equipped in the memory 101 of improved IVI system 100. Software enhancements to the improved IVI system 100 include, but are not limited to real-time hospital data software 106, emergency reporting software 107 and appointment scheduler 108.

The improved IVI system 100 additionally includes a sim card 109, GPS module 110 and data storage 111 that is accessible by the processor 103 through the system bus 102. The data storage 111 may include executable instructions and executable protocols. The improved IVI system 100 also includes an input interface 112 that allows external devices to communicate with the improved IVI system 100. For instance, the input interface 112 may be used to receive instructions from an external computer device, from a user, etc. The improved IVI system 100 also includes an output interface 113 that interfaces the improved IVI system 100 with one or more external devices. For example, the improved IVI system 100 may display video or images, etc. by way of the output interface 113.

It is contemplated that the external devices that communicate with the improved IVI system 100 via the input interface 112 and the output interface 113 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the improved IVI system 100 in a manner free from constraints imposed by input device such as keyboards, mice, remote controls, and the like. Rather, a natural user interface can rely on speech recognition, touch and stylus recognition, gesture recognition both on screen and adjacent improved IVI system 100 to the screen, air gestures, head and eye tracking, voice and speech, vision, touch, gestures, machine intelligence, and so forth.

It is further contemplated that other in-vehicle modules communicating with IVI system 100 include the electronic data recorder (EDR) 114, camera(s) 115, V2V transmitter/receiver 116 and holographic module 117

Additionally, while illustrated as a single system, it is to be understood that the improved IVI system 100 may be a distributed system. Thus, for instance, several devices may be in communication by way of a network connection and may collectively perform tasks described as being performed by the improved IVI system 100.

Figure 2:
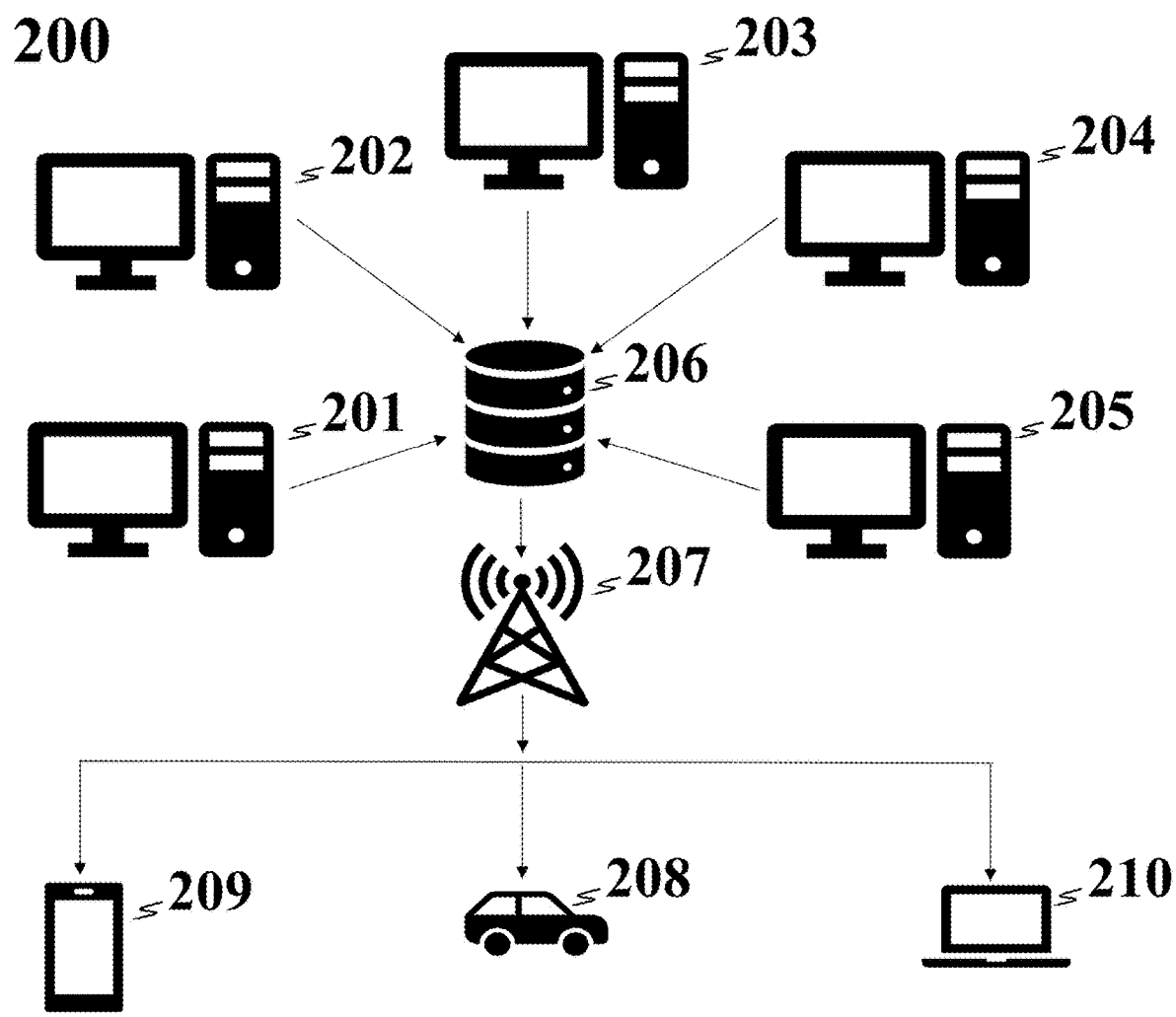
FIG. 2 is the functional block diagram of an exemplary improved system and method to receive, transmit and display a plurality of hospital data elements, emanating from a plurality of hospitals onto the in-vehicle display screen of a vehicle equipped with an improved IVI system or similar computing device.

With reference to FIG. 2, an exemplary system 200 that facilitates an emergency hospital protocol to display hospital data elements onto the display screen of the vehicle through a GUI. Individual hospital data elements emanating from a plurality of individual hospitals or nodes equipped with a software program facilitating the retrieval and transmission of individual hospital real-time data elements include, but are not limited to hospital name, static hospital GPS coordinates, hospital wait time, hospital capacity, hospital medical specialties, available rooms, number of emergency room patients, doctors on call, in-network insurance availability, price per visit and cafeteria availability. In one embodiment, a series of non-connected independent nodes in the form of various hospital or medical center computers 201, 202, 203, 204, 205 equipped with software capable of scrapping individual hospital real-time data elements. Independent hospital computers or nodes transmit individual hospital data elements out to aggregate server 206. Aggregate server 206 functions as a centralized collection point for all independent hospital data elements collected from the independent nodes equipped with software to scrape hospital data elements. Aggregate server 206 runs a protocol to assemble all hospital data elements transmitted into a single file format. In some embodiments, aggregate server 206 may run a protocol to compress and encode the data file.

After aggregate server 206 compiles all hospital data into a single file format, a single file is transmitted out to a cell tower, satellite or radio transmitter 207. When the cell tower, satellite or radio transmitter 207 receives the data file, it is then transmitted out to a computational device, including but not limited to an IVI system 208, a mobile phone 209 or a laptop computer 210 equipped with the emergency navigation software 104 or firmware 105 and the additional enhancement hospital data software 106 software.

Figure 3:
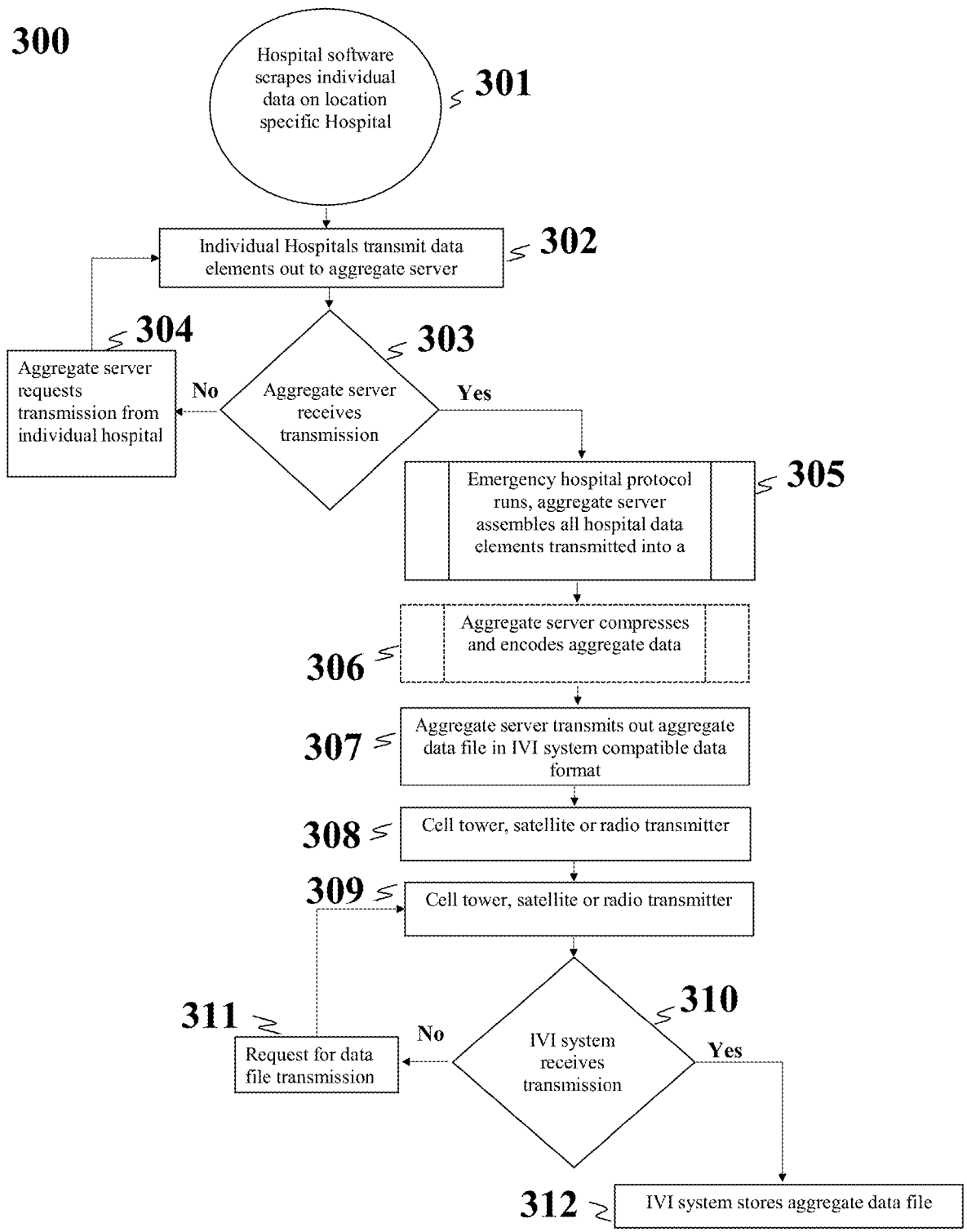
FIG. 3 is a flow diagram that illustrates an exemplary improved system and method that facilitates collecting, transmitting and receiving a plurality of hospital data elements emanating from a plurality of hospitals onto the in-vehicle display screen of a vehicle equipped with an improved IVI system.

Referring now to FIG. 3, an improved methodology 300 that facilitates the transmission and retrieval of non-patient specific hospital data elements. Hospital software pre-loaded onto a designated hospital or medical center's computing device scrapes the requested hospital data elements, thus facilitating the aggregation of hospital data elements.

Methodology starts with the pre-loaded hospital software scrapes individual hospital data elements on location specific hospital 301. Methodology then transitions to individual hospitals transmit data elements out to aggregate server 302. Individual hospital data elements may include any non-patient identifying data including real-time hospital name, static hospital GPS coordinates, hospital patient capacity, total available rooms, hospital estimated wait time, emergency room patients, doctors on call, in-network insurance availability, price per visit, doctor specialties available and cafeteria availability are collected and transmitted using the hospital software at set intervals of time.

After the individual hospitals transmit data elements out to the aggregate server, the methodology transitions to aggregate server receives transmission 303, which includes the individual hospital data elements collected from a plurality of hospitals within the system, with the system being defined by all individual hospital locations equipped with the hospital software capable of scraping the hospital specific data elements. If the aggregate server fails to receive the individual hospital data at a pre-set time interval, the methodology transitions to the aggregate server requesting transmission from individual hospital 304.

If the aggregate server receives transmission 303, methodology transitions to an emergency hospital protocol runs, aggregate server assembles all individual hospital data elements transmitted into a single aggregate data file 305. In some embodiments, the aggregate data file 305 may be compressed and encoded whereby the methodology transitions to the aggregate server compresses and encodes data file 306. While optional, compressing and encoding will be performed within the emergency hospital protocol on the aggregate server. Methodology then transitions to the aggregate server transmits aggregate data file in IVI system compatible data format 307. Data files and attachments may include compressed and encoded data formats as well.

After the aggregate server transmits out aggregate data file in IVI system compatible data format 307, the methodology transitions to a cell tower, satellite or radio transmitter receives aggregate data file 308. After receiving the data file at a set time interval, the cell tower, satellite or radio transmitter transmits aggregate data file out 309.

After the cell tower, satellite or radio transmitter transmits data file out 309, the methodology then transitions to the IVI system receives transmission 310. If IVI system fails to receive the aggregate data file after a set time interval, methodology transitions to the aggregate server making a request for data file transmission 311. If the IVI system receives the data file transmission 310, the IVI system stores the aggregate data file 312.

Figure 4:
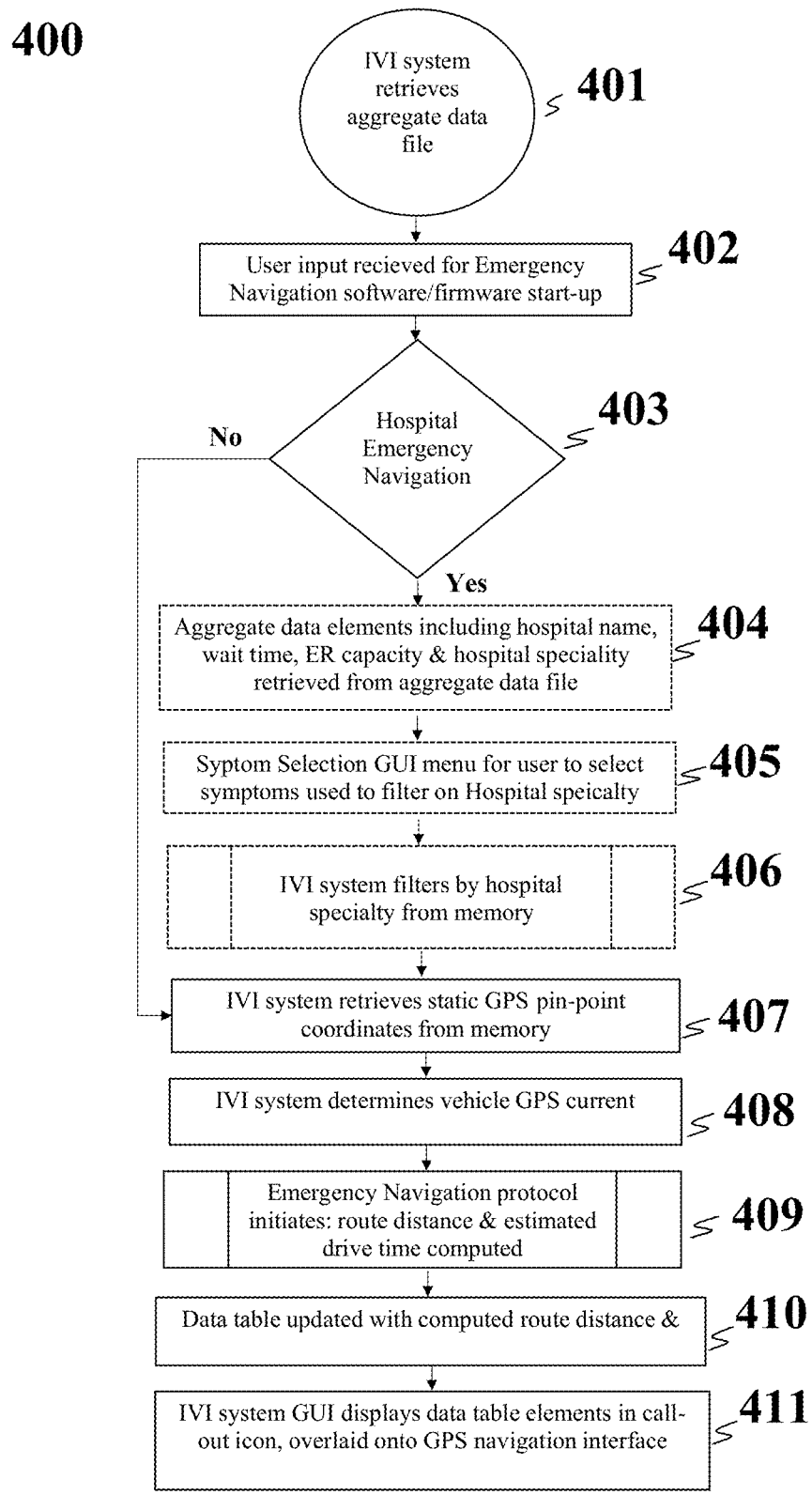
FIG. 4 is a flow diagram that illustrates an improved system and method to receive and display hospital data elements with computed route distance and estimated drive time into a callout icon on a display screen of a vehicle equipped with an improved IVI system.

Referring now to FIG. 4, an improved methodology 400 that facilitates the display of hospital emergency locations as identified by pinpoints with callout icons including data elements overlaid onto the display screen of the vehicle through a GUI. Methodology starts with IVI system retrieves aggregate data file 401. Methodology transitions to user input received for emergency navigation software or firmware start-up 402.

If user input is received and the hospital emergency navigation software or firmware is selected 403 on the IVI system GUI, the methodology in some embodiments, transitions to aggregate data elements file including hospital name, wait time, emergency room (ER) capacity and hospital specialty retrieved from aggregate data file 404. Hospital name, wait time, ER capacity and hospital specialty may facilitate user-selectable filter criteria. Methodology then transitions, in some embodiments, to symptom selection GUI menu for user to select symptoms used to filter on hospital specialty 405. Symptom selection, wait time, ER capacity, hospital specialty or any data element may facilitate filtering from a pre-configured user-selectable GUI menu. In yet other embodiments, methodology then transitions to a hospital filter protocol whereby the computing device filters by hospital specialty from memory 406. Methodology then transitions to IVI system retrieves static GPS pinpoint coordinates from memory 407.

If hospital emergency navigation is not selected 403, methodology transitions directly to IVI system retrieves static GPS pinpoint coordinates from memory 407. Hospital specific data elements, used for filtering will not be retrieved from the aggregate data file and therefore the symptom selection or other data element filtering GUI menu will not be prompted for user selection and therefore the hospitals will not be filtered by specialty.

After the IVI system retrieves static GPS pinpoint coordinates from memory 407, methodology transitions to computing device determines vehicle GPS current position 408. Methodology then transitions to emergency navigation protocol initiates: route distance and estimated drive time computed 409. Route distance and drive time are estimates derived from the difference between the GPS coordinate positioning of the driven vehicle and the static hospital GPS coordinate location as denoted by the pinpoint icons.

Data from the aggregate data file stored onto memory will facilitate two writeable data elements facilitating computed route distance and estimated drive time. Methodology then transitions to updating locally stored aggregate data file with computed route distance and estimated drive time 410.

After the data table is updated with computed route distance and estimated drive time 410, methodology then transitions to IVI system GUI displays data table elements in callout icon, overlaid onto GPS navigation interface 411. If hospital navigation is selected, callout data elements may include additional data elements including hospital name, wait time and ER capacity, hospital specialty, etc. in addition to the computed route distance and estimated drive time. Computed route distance and estimated drive time derived from emergency navigation protocol are included regardless of user selection of hospital emergency navigation selection.

Figure 5:
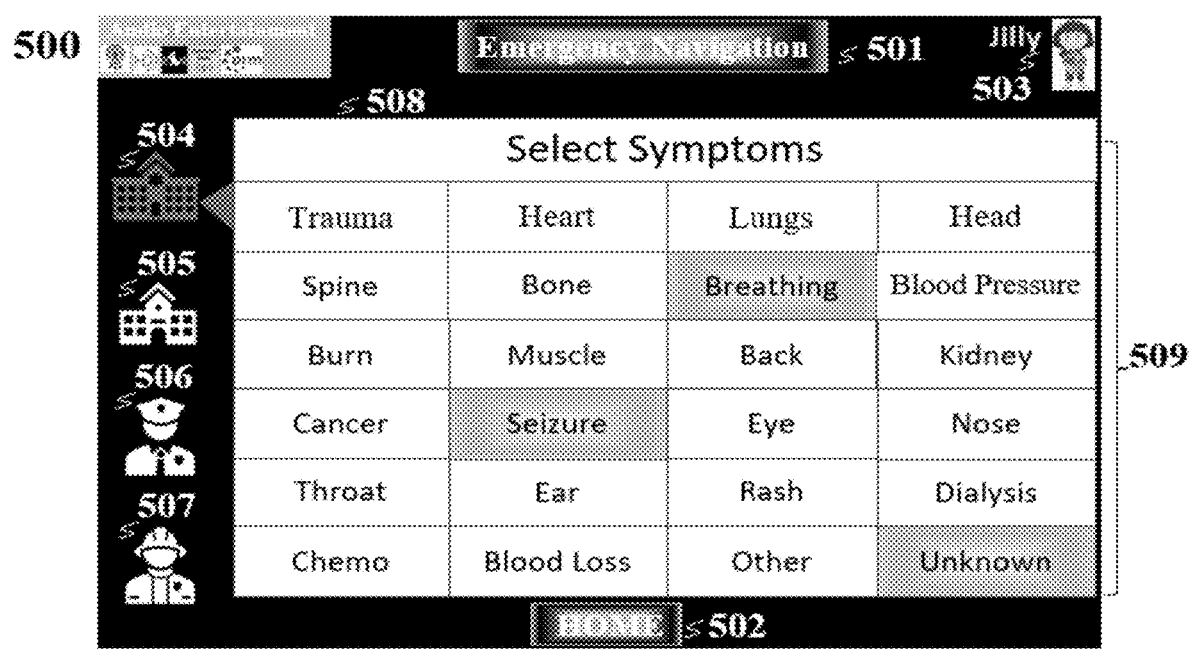
FIG. 5 is a mockup of an improved IVI system in the form of a vehicle display screen IVI GUI, equipped to receive user inputs for pre-defined medical symptoms.

Referring now to FIG. 5, a mockup of an IVI system GUI 500 equipped with emergency navigation software 104 or firmware 105 is displayed. Atop the middle of the IVI system GUI 500 is the emergency navigation header 501, denoting the emergency navigation software 104 or firmware 105 has been selected. To the Bottom of the IVI system GUI 500 is the home button 502. Home button 502 exits the emergency navigation software 104 or firmware 105, returning the user back to the IVI system GUI landing page. Additionally, in one embodiment to the right of the emergency navigation header 501 is the username and avatar 503. Username and avatar enable additional functionality to facilitate user identification for data transmission.

Far left of the IVI system GUI 500 display are user input selections, identified by single-touch icons operating within the emergency navigation software 104 or firmware 105 identified by a series of icons starting with a hospital 504, school 505, policeman 506 or fireman 507.

After user selects an icon from the IVI system GUI 500, the icon in one embodiment, will illuminate in a blue color denoting it has been selected. Additionally, a select symptoms header 508 is displayed, along with a pre-configured user-input selectable symptom table 509 that defines common symptoms. In one embodiment, a multitude of symptoms have been defined by the user-input from the selectable symptom table 509 from the IVI system GUI 500.

Figure 6:
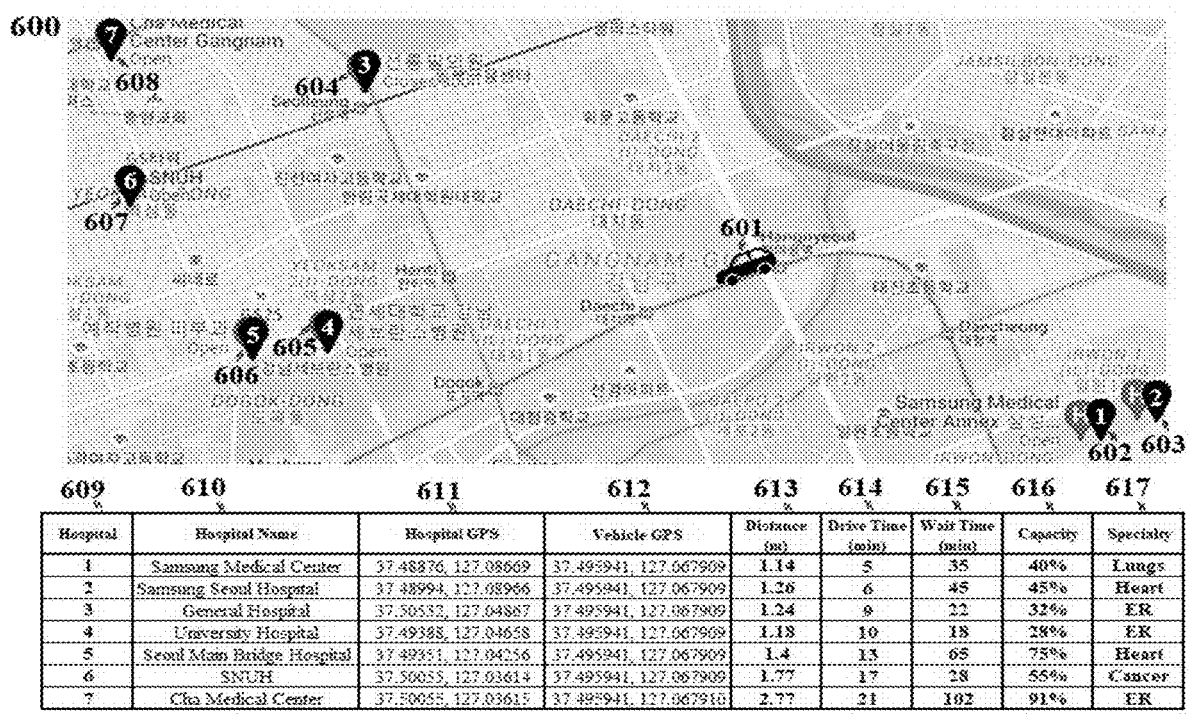
FIG. 6 is a functional block diagram and accompanying data table facilitating the emergency navigation application and hospital data application for use on an improved IVI system, detailing the emergency data elements facilitating an improved IVI system GUI display.

Referring now to FIG. 6, a graphic and tabular display 600 of a GPS navigation interface and table with data elements facilitating the operation and display of an IVI system equipped with emergency navigation software 104 and firmware 105. Current vehicle GPS position, defined by the vehicle's GPS coordinates as reported by the IVI system's GPS module 110, is displayed via a vehicular icon 601 overlaid onto a GPS navigation interface. Vehicle GPS position moves dynamically in accordance with the vehicle position and is not pre-defined.

Additionally, static hospital location pinpoint icons 602, 603, 604, 605 and 606, defined by the GPS coordinates stored into IVI system memory 101 are overlaid onto the GPS navigation interface. In one embodiment, hospital pinpoint icons 602, 603, 604, 605 and 606 are numerically identified by distance in ascending order, arranged from the relative distance from the current vehicle's GPS position to hospital specific pinpoints. In yet other embodiments the hospital pinpoint icons 602, 603, 604, 605 and 606 dynamically change numerical values relative to the dynamic changes in vehicle positioning. In other embodiments, the hospital pinpoint icons 602, 603, 604, 605 and 606 numerical values assigned are static, values pre-determined or time dependent upon the vehicle GPS position at the time of opening the emergency navigation software 104 or firmware 105.

Below the graphic of a GPS navigation interface is a dynamic data table populated with hospital and vehicle specific data facilitating the emergency navigation software 104 or firmware 105 along with the additional hospital data software 106. Tabular data elements include, but are not limited to a hospital column 609 represented by a numeric designation, identified in ascending order, arranged by distance as calculated from the relative distance from a vehicle's current GPS position to a static hospital specific pinpoint. The hospital column 609 pairs a numeric value to a hospital name column 610, which includes the hospital name derived from the IVI system memory 101. Associated with the hospital name column 610 is a hospital GPS coordinate column 611 consisting of a multitude of static GPS coordinates derived from the IVI system memory 101. Static hospital GPS coordinate column 611 enables functionality of the IVI system GUI to display static hospital pinpoints. Along with the static hospital GPS coordinate column 611 is a dynamic current vehicle GPS coordinate column 612 detailing the vehicle's GPS positioning captured at set-time intervals. Additionally, vehicle GPS coordinate column 612 facilitates a methodology enabling the IVI system processor 103 equipped with executable instructions to process the distance column 613 and drive time column 614 between the dynamic vehicle GPS coordinate and the multitude of static hospital specific pinpoints.

Additionally, in one embodiment, for IVI system's equipped with the hospital data software 106, aggregate data file including hospital name, wait time and emergency room capacity retrieved from data table 404 populates the table data fields including but not limited to wait time column 615, capacity column 616 and specialty column 617. In other embodiments the specialty column 617 is read from the IVI system memory 101.

Figure 7:
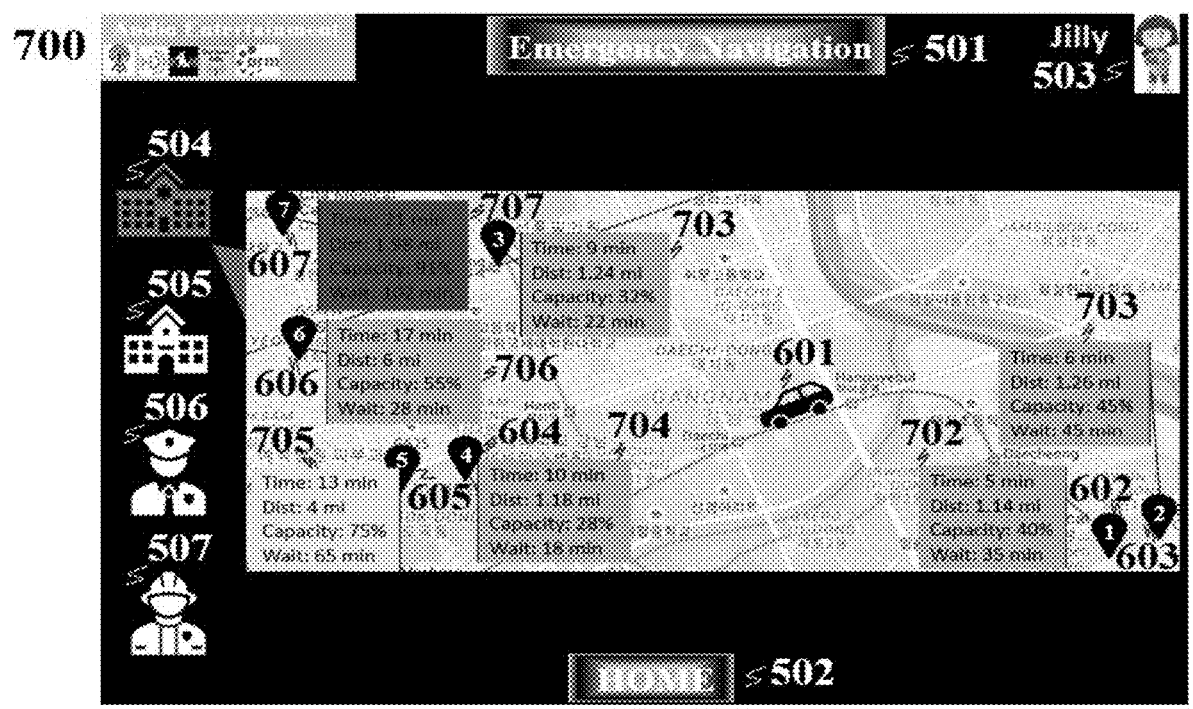
FIG. 7 is a mockup of an improved IVI system in the form of a vehicle display screen IVI GUI with single touch iconography facilitating the display of emergency destinations in the form of all nearby hospitals with color-coded callout icons containing hospital data elements, computed route distance and estimated drive time overlayed onto a GPS navigation interface display.

Referring now to FIG. 7, a mockup of an improved in-vehicle IVI system GUI 700 display of an IVI system equipped with emergency navigation software 104 or firmware 105 and hospital data software 106. Atop the middle of the IVI system GUI 700 is the emergency navigation header 501, denoting the emergency navigation software 104 or firmware 105 has been selected. In other embodiments a header denoting the hospital data may be displayed.

To the bottom of the IVI system GUI 700 is the home button 502. Home button 502 exits the emergency navigation software 104 or firmware 105, returning the user back to the IVI system GUI landing page. Additionally, in one embodiment to the right of the emergency navigation header 501 is the username and avatar 503.

Far left of the IVI system GUI 500 display are user input selections, identified by single-touch icons operating within the emergency navigation software 104 or firmware 105 identified by a series of icons starting with a hospital 504, school 505, policeman 506 or fireman 507.

After user selects an icon from the IVI system GUI 700, the icon in one embodiment, will illuminate in a blue color, denoting it has been selected. In one embodiment, hospital icon 504 is selected, highlighted in blue after user input is received. To the right of hospital icon 504 is a GPS navigation interface with hospital pinpoint icons 602, 603, 604, 605 and 606 numerically identified by distance from the vehicle, in ascending order, with callout overlays 702, 703, 704, 705 and 706 including, but not limited to time to pinpoint, distance (dist.) to pinpoint, hospital aggregate data wait time and capacity, collected from the aggregate data file.

In other embodiments callout overlays 702, 703, 704, 705 and 706 may contain additional data elements including, but not limited to hospital name, static hospital GPS coordinates, hospital patient capacity, total available rooms, hospital estimated wait time, emergency room patients, doctors on call, in-network insurance availability, price per visit, doctor specialties available and cafeteria availability collected from the aggregate data file.

Figure 8:
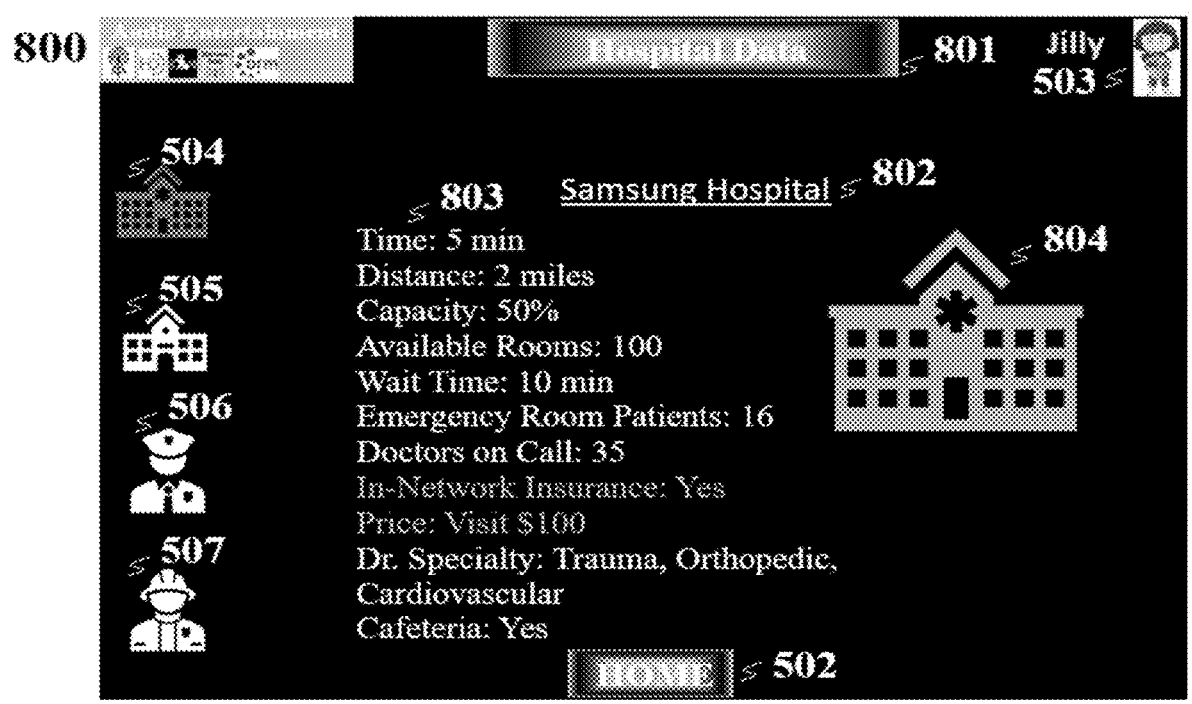
FIG. 8 is a mockup of an improved IVI system in the form of a vehicle display screen IVI system GUI for a detailed view of individual hospital data elements.

Referring now to FIG. 8, a mockup of an IVI system GUI 800 display of an improved IVI system equipped with emergency navigation software 104 or firmware 105 and hospital data software 106. Atop the middle of the IVI system GUI 800 is the hospital data header 801, denoting the hospital data software 106 has been selected. To the Bottom of the IVI system GUI 800 is the home button 502. Home button 502 exits the emergency navigation software 104 or firmware 105, returning the user back to the IVI system GUI landing page. Additionally, in one embodiment to the right of the hospital data header 801 is the username and avatar 503. Additionally, located on the far left of the IVI system GUI 500 display are user input selections, identified by single-touch icons operating within the emergency navigation software 104 or firmware 105 identified by a series of icons starting with a hospital 504, school 505, policeman 506 or fireman 507.

In one embodiment, hospital name 802 is included in the upper-center portion of the IVI System GUI 800. Below the hospital name 802 includes dynamic geographical data including distance and drive time derived from distance column 613 and drive time column 614 with hospital data elements 803, extracted from the hospital aggregate data file, including, but not limited to hospital name, static hospital GPS coordinates, hospital patient capacity, total available rooms, hospital estimated wait time, emergency room patients, doctors on call, in-network insurance availability, price per visit, doctor specialties available and cafeteria availability. To the right of the hospital data elements is an enlarged hospital icon 804. In other embodiments, hospital icon 804 is the individual hospital logo.

Figure 9:
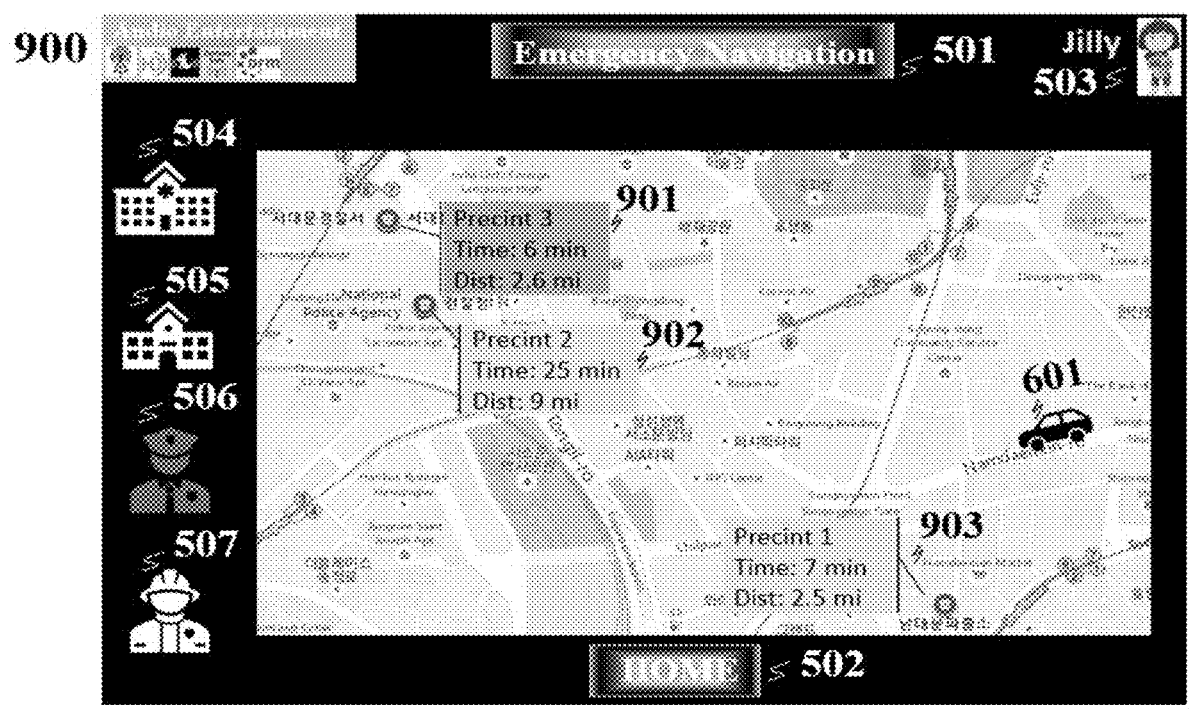
FIG. 9 is a mockup of an improved IVI system in the form of a vehicle display screen IVI GUI with single touch iconography facilitating the display of emergency destinations in the form of all nearby police stations with color-coded callout icons containing police station data elements, computed route distance and estimated drive time overlayed onto a GPS navigation interface display.

Referring now to FIG. 9, a mockup of an improved in-vehicle IVI system GUI 900 display of an IVI system equipped with emergency navigation software 104 or firmware 105. Atop the middle of the IVI system GUI 900 is the emergency navigation header 501, denoting the emergency navigation software 104 or firmware 105 has been selected. To the bottom of the IVI system GUI 900 is the home button 502. Home button 502 exits the emergency navigation software 104 or firmware 105, returning the user back to the IVI system GUI landing page. Additionally, in one embodiment to the right of the emergency navigation header 501 is the username and avatar 503. Additionally, located on the far left of the IVI system GUI 900 display are user input selections, identified by single-touch icons operating within the emergency navigation software 104 or firmware 105 identified by a series of icons starting with a hospital 504, school 505, policeman 506 or fireman 507.

After user selects an icon from the improved IVI system GUI 900, the icon in one embodiment, will illuminate in a blue color denoting it has been selected. In one embodiment, policeman icon 506 is selected, highlighted in blue after user input is received. To the right of policeman icon 506 is a GPS navigation interface with current vehicle GPS position displayed via a vehicular icon 601 and a multitude of police departments or precinct pinpoints with callout icons 901, 902 and 903. Police departments or precinct pinpoints with callout icons 901, 902 and 903 include, but are not limited to data such as police department name or precinct name and hours of operation. Data elements for callouts and static GPS pinpoint coordinates are retrieved from computing device memory.

Additionally, police department or precinct pinpoint callout overlays 901, 902 and 903 include time and distance computed via the IVI system processor 103 from executable instructions stored within the IVI system memory 101 whereby the actual vehicle's position is obtained from the IVI system GPS sensor 110 and the static position of the pinpoints are obtained from the IVI system memory 101.

Figure 10:
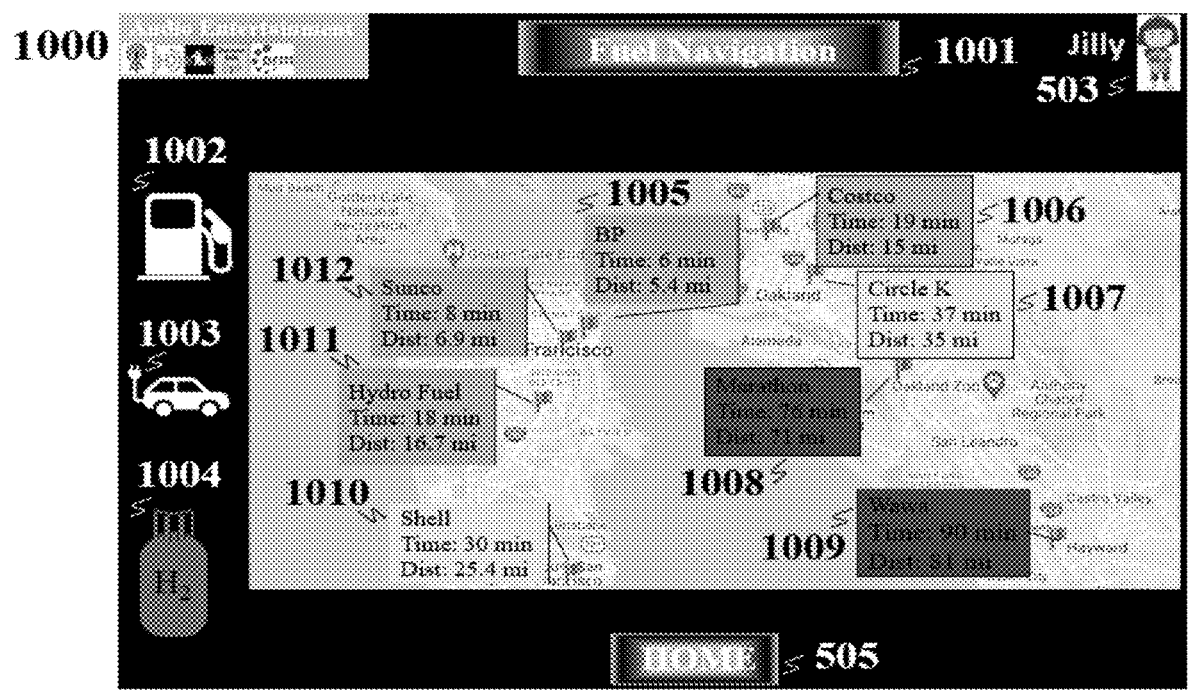
FIG. 10 is a mockup of an improved IVI system in the form of a vehicle display screen IVI GUI with single touch iconography facilitating the display of emergency destinations in the form of all nearby hydrogen fuel stations with color-coded callout icons containing fuels station data elements, computed route distance and estimated drive time overlayed onto a GPS navigation interface display.

Referring now to FIG. 10, a mockup of an improved in-vehicle IVI system GUI 1000 display of an IVI system equipped with emergency navigation software 104 or firmware 105. Atop the middle of the IVI system GUI 1000 is the fuel navigation header 1001, denoting the emergency navigation software 104 or firmware 105 has been selected. To the bottom of the IVI system GUI 1000 is the home button 502. Home button 502 exits the emergency navigation software 104 or firmware 105, returning the user back to the IVI system GUI landing page. Additionally, in one embodiment to the right of the emergency navigation header 501 is the username and avatar 503.

After user selects a fuel icon from the IVI system GUI 1000, the icon in one embodiment will illuminate in a blue color denoting it has been selected. Additionally, located on the far left of the IVI system GUI 1000 display are user input selections, identified by a plurality of single-touch icons operating within the emergency navigation software 104 or firmware 105, which includes a series of fuel station icons starting with a gas pump 1002, electric vehicle plug-in 1003 or hydrogen 1004.

In one embodiment, hydrogen icon 1004 is selected, highlighted in blue after user input is received. To the right of the hydrogen icon 1004 is a GPS navigation interface with a multitude of hydrogen fueling stations denoted by static pinpoint callout icons 1005, 1006, 1007, 1008, 1009, 1010, 1011 and 1012. Fuel navigation icons with static pinpoint and callout icons 1005, 1006, 1007, 1008, 1009, 1010, 1011 and 1012 include, but are not limited to data elements such as fuel station name, estimated time from fuel station and computed distance from fuel station. Data for callouts and static GPS pinpoint coordinates are retrieved from computing device memory 101.

In other embodiments callout icons 1005, 1006, 1007, 1008, 1009, 1010, 1011 and 1012 include may include any additional fuel station data elements including fuel price, hydrogen purity, diesel availability, battery charger specifications, certification of station, quality verification level or any other pertinent data elements regarding the fuel station.

In one embodiment callout icon is color coordinated with distance proximity from driven vehicle. Green color callout icon denoting the station is nearby distance or a short time interval away, easily within the range of the vehicle's current fuel range as reported from the vehicle's CANBus network. Yellow color callout icon denoting station is moderately nearby distance, within a set range or moderate time interval away but well within vehicle's remaining fuel range as reported from the vehicle's CANBus network. Red color callout denoting a long-distance proximity range or long-time interval exceeding the fuel range as reported from the vehicle's CANBus network.

In other embodiments, callout color may be dynamic and change with the proximity between driven and nearby vehicle or change color based on changes in traffic patterns. Should an incident occur on the destined route of travel, the callouts may change color accordingly.

Figure 11:
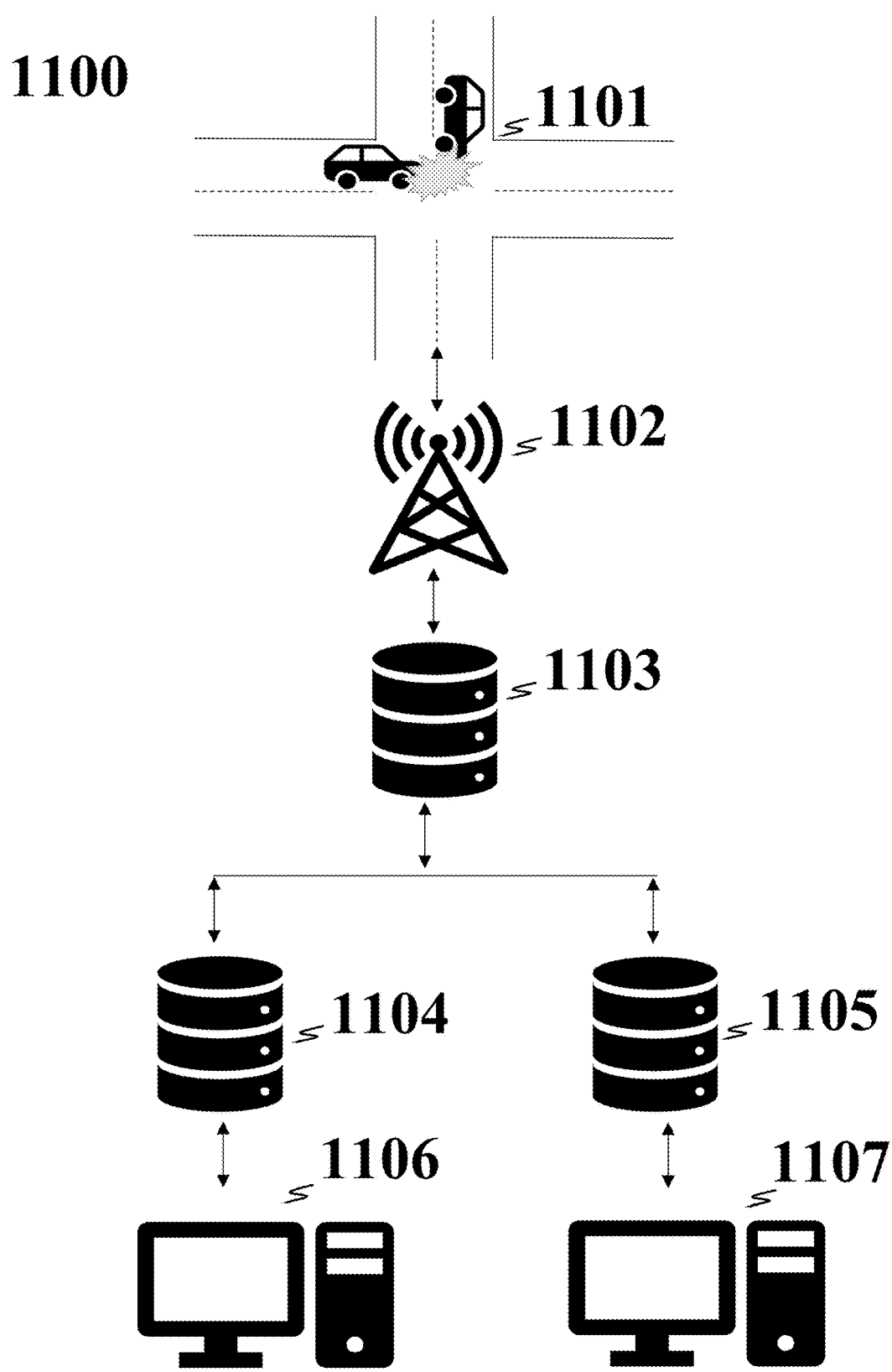
FIG. 11 is the functional block diagram of an exemplary improved IVI system and method to automatically transmit vehicle, person and crash data elements along with EDR and camera data elements out to an emergency routing server, then out to a localized jurisdiction's dispatch server and a nationalized or state crash database.

Referring now to FIG. 11, an exemplary system 1100 that facilitates the emergency navigation software 104 or firmware 105 and emergency reporting software 107 for manual or automatic transmission of an emergency event emanating from a user input selected from a pre-defined menu on the input interface 112 or an automatic event emanating from inputs received from vehicle modules over the vehicle's CANBus network. Emergency report may additionally attach and transmit data collected from the vehicle's CANBus network including but not limited to electronic data recorder (EDR) 114 or vehicle camera(s) 115.

Methodology starts with a collision between two vehicles 1101. In one embodiment, the collision event triggers an automated emergency report data transmission through the improved IVI system 100, equipped with a cellular connection with onboard sim card 109 via the vehicle's CANBus network. In other embodiments, the user may manually enter in emergency details and attach an EDR 114 or camera(s) 115 video file. Automated reports may automatically transmit an emergency report and EDR 114 data from the IVI system GUI. Emergency report format transmits may include pre-selected data facilitating national highway safety and transportation administration (NHSTA) model minimum uniform crash criteria (MMUCC) and may also transmit additional data files including, but not limited to in-vehicle or front-facing camera(s) 115 video files.

Methodology transitions to a cellular tower, satellite or radio tower 1102 receiving the emergency report and any attached data, then transmitting out to an emergency routing database 1103. Emergency routing server 1103 receives automated or manually entered emergency data emanating from the emergency report, along with any attached data emanating from the vehicle's CANBus network. Emergency routing server 1103 protocol uses the vehicle's GPS coordinates as reported by the improved IVI system 100 equipped with a GPS sensor 110, at the time as noted in the emergency report. Emergency routing server 1103 then processes the vehicle's reported GPS coordinates with a file containing the geo-coordinate boundaries for a multitude of jurisdictions as noted by GPS coordinate latitudes and longitudes. Emergency routing server 1103 then matches the appropriate jurisdiction with the location where the emergency report was transmitted and transmits out the report to the local jurisdiction's dispatch server 1104, as noted on the data file within emergency routing server 1103.

Additionally, emergency routing server 1103 facilitates a protocol recognizing the type of emergency report selected from the IVI system GUI. In one embodiment, emergency reports are received by the emergency routing server 1103 automatically as a result of an in-vehicle event such as vehicle impact or airbag deployment. After receiving the emergency report, emergency routing server transmits report out to the localized jurisdiction's dispatch server 1104 and a nationalized or state crash database 1105 including, but not limited to the crash report sampling system (CRSS), national automotive sampling system general estimates system (NASS GES), fatality analysis reporting system (FARS), crash investigation sampling system (CISS), special crash investigations (SCI), non-traffic surveillance (NTS) or crash injury research & engineering network (CIREN).

In other embodiments, the automated data elements included in the report may facilitate model minimum uniform crash criteria (MMUCC) guideline data element requirements. MMUCC guideline data elements transmitted from the improved IVI system aid investigations by standardizing reports with automated data element collection, evaluated when analyzing vehicular incidents.

Upon receipt of the emergency report by the localized jurisdiction's dispatch server 1104, localized dispatch agent can review data elements received from a local secure electronic device 1106. In some embodiments, local secure electronic device 1106 may decrypt data file from localized jurisdiction's dispatch server 1104.

Additionally, a national or state specific crash database 1105, including but not limited to the CRSS, NASS GES, FARS, CISS, SCI, NTS or CIREN databases may be assessable directly or indirectly accessible from a national or state secure electronic device 1107. In some embodiments, data from national or state specific crash database 1105 may be made accessible to the general public through access to all or a portion of the data elements emanating from the emergency report.

Figure 12:
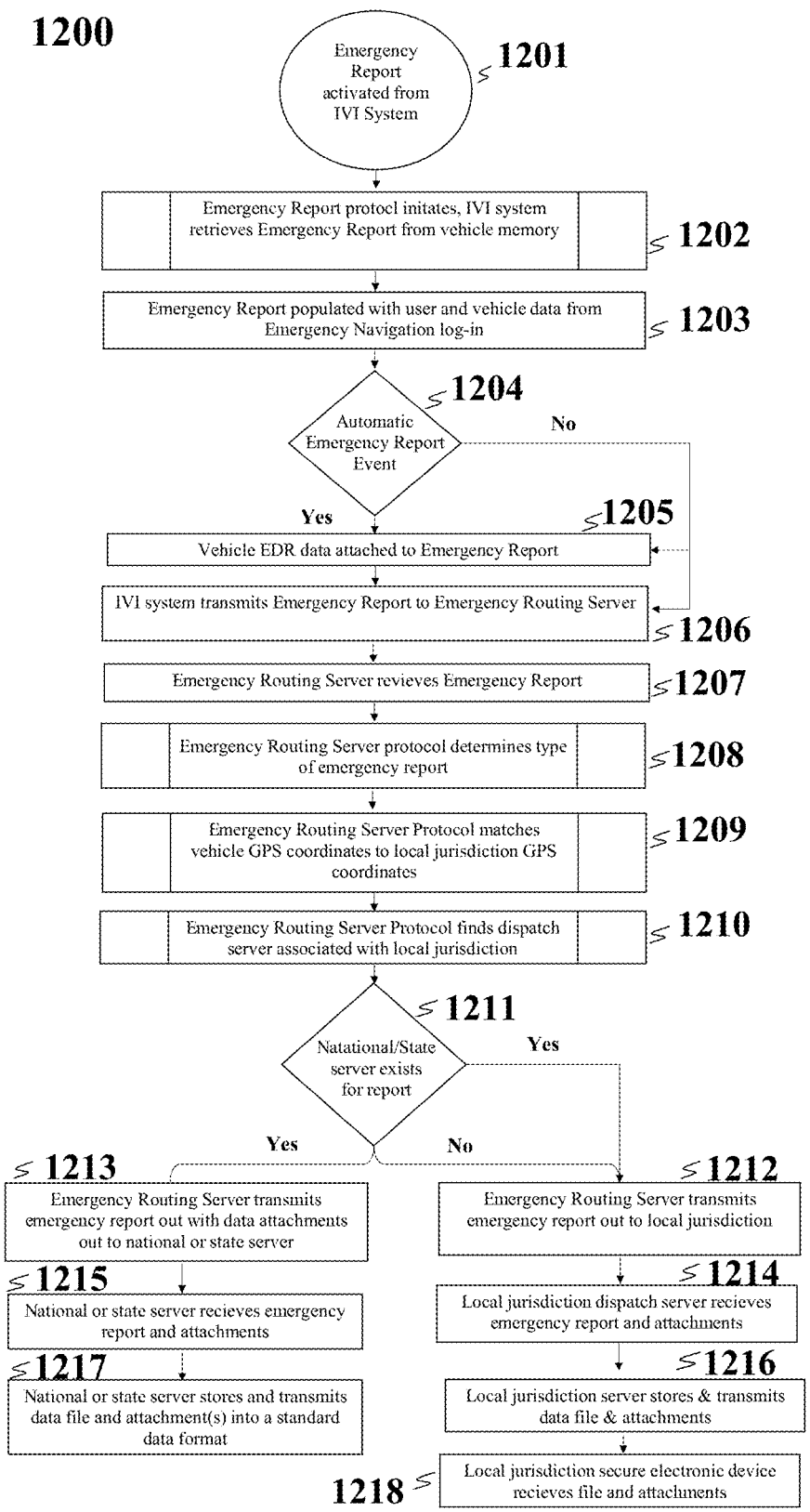
FIG. 12 is a flow diagram that illustrates an improved IVI system and method that facilitates transmitting emergency data elements and attachments in an emergency report and out to both a local jurisdiction's dispatch server and nationalized or state server.

Referring now to FIG. 12, an improved methodology 1200 that facilitates the transmission and retrieval of a standardized emergency report from an improved IVI system 100 equipped with emergency navigation software 104 or firmware 105 and emergency reporting software 107. Emergency reporting software 107 initiates standardized emergency report templates compatible with local, state and federal dispatch servers and databases, including but not limited to the CRSS, NASS GES, FARS, CISS, SCI, NTS or CIREN databases. Coupled with user log-in information, emergency reports generated from the IVI system enable faster data collection from the vehicle's CANBus network, along with key identifiable user data emanating from user-inputted data included in the improved IVI system 100 that would otherwise need to be collected by an emergency responder after an emergency event had occurred.

Methodology starts with an emergency report activated from IVI system 1201. Methodology transitions to emergency report protocol initiates, IVI system retrieves emergency report from vehicle memory 1202. Both manual and automatic reports are derived from report templates residing on the improved IVI system memory 101.

Methodology transitions to emergency report populated with user and vehicle data from emergency navigation log-in 1203. Methodology then transitions to automatic emergency report event 1204. If an automatic emergency report event 1204 has occurrent in-vehicle, causing the automatic emergency report to be generated, vehicle EDR data is attached 1205. Vehicle EDR data is attached to the emergency report without a user-input on the improved IVI system 100. Methodology transitions to IVI system transmits emergency report to emergency routing server 1206.

If an automatic emergency report event has not occurred, vehicle EDR data attached to emergency report 1204 can be manually inputted by a user from the improved IVI system 100 GUI. In some embodiments, manually initiated emergency reports may not require vehicle EDR data attached. Methodology transitions to the IVI system transmits emergency report to emergency routing server 1206.

Methodology transitions to emergency routing server receives emergency report 1207 including any additional attached data files emanating from the vehicle, including EDR data and images from in-vehicle camera's operating within the vehicle's CANBus network at the time of the reported emergency event. After emergency routing server receives emergency report 1207, methodology transitions to emergency routing server protocol determines type of emergency report 1208. Upon receipt of the emergency report, emergency routing server protocol matches vehicle GPS coordinates to local jurisdiction GPS coordinates 1209. Emergency server protocol retrieves a locally stored GPS file with known local jurisdictions as defined by a geo-fenced area comprised of GPS latitude and longitude coordinates, listed in a file stored onto the emergency routing server 1103. Emergency routing server 1103 protocol then computes a matching local jurisdiction GPS coordinate geo-fenced area encompassing the vehicle's reported GPS latitude and longitude coordinates derived from improved IVI system 100 at the time of an emergency report.

Methodology transitions to emergency routing server protocol finds dispatch server associated with local jurisdiction 1210. After matching both variable GPS latitude and longitude coordinates, as defined in the improved IVI system 100 emergency report at the time of transmission within a geo-fenced area of a local jurisdiction encapsulated within the geo-fenced area, a corresponding dispatch server identifiable via a unique IP address is retrieved from the emergency routing server data file.

If a national or state server exists for report type 1211, an identifiable unique IP address is retrieved from the emergency routing server data file, similar to the retrieval of the IP address of the local jurisdiction's dispatch server.

Methodology transitions to emergency routing server transmits emergency report out to local jurisdiction dispatch server 1212. Methodology then transitions to local jurisdiction dispatch server receives emergency report and attachments 1214. Methodology then transitions to local jurisdiction server stores and transmits data file and attachments 1216. Finally, methodology transitions to local jurisdiction secure electronic device receives file and attachments 1218.

If a national or state database exists for report type 1211, methodology transitions to emergency routing server transmits emergency report out with data attachments to a national or state server 1213. Methodology transitions to national or state server receives emergency report and attachments 1215. Upon receipt of the emergency report and attachments 1215, a national or state server stores and transmits data file and attachment(s) into a standard data format 1217.

Local jurisdiction secure electronic device may populate a new report file with the data elements obtained from the emergency routing server. Additionally, data file format previously created from the emergency routing server may accommodate continuance of reporting, facilitating manual entry for data elements including road surface condition, road debris or road obstructions, which may be excluded from the in-vehicle data collection obtained from the improved IVI system 100, vehicle EDR 114 or any other in-vehicle module communicating over the vehicle's CAN-Bus network. Local jurisdictions may also add additional data elements into the previously created emergency report, crated in the emergency routing server, for reductions in manual data entry and eliminating report duplication.

Figure 13:
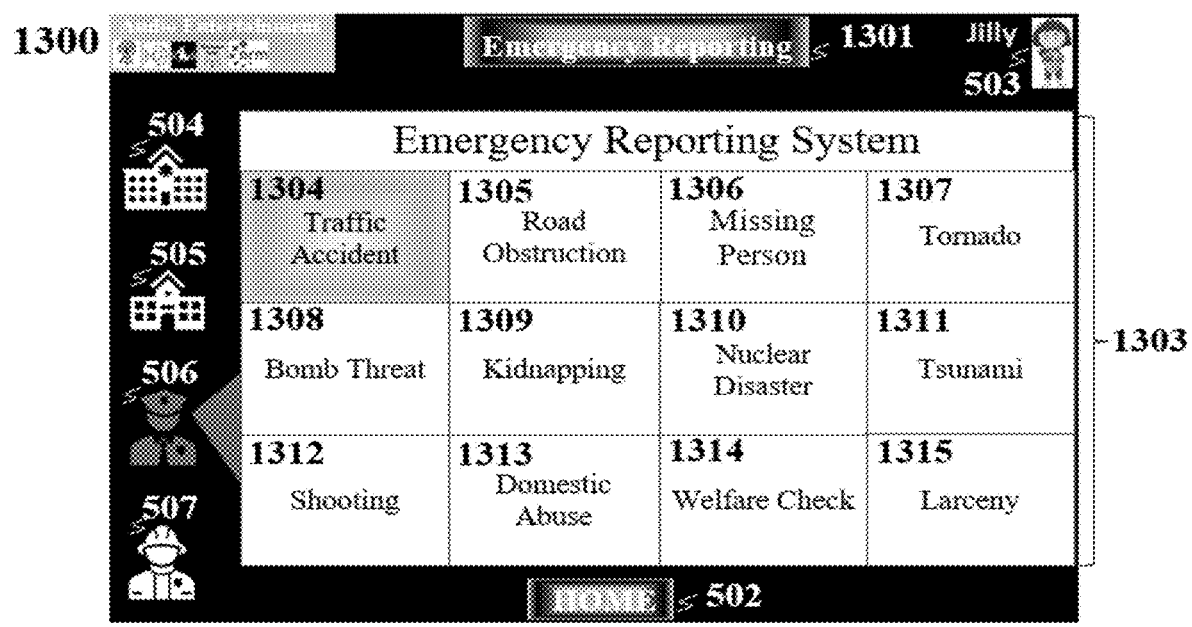
FIG. 13 is a mockup of an improved IVI system touchscreen GUI with single touch iconography facilitating the display of a pre-configured single-touch menu for manual emergency reporting in tabular format.

Referring now to FIG. 13, a mockup of an improved IVI system GUI 1300 that facilitates the emergency navigation software 104 or firmware 105 and emergency reporting software 107 for manual transmission of an emergency event emanating from a user input selected from a pre-defined menu on the input interface 112. Atop the middle of the IVI system GUI 1300 is the emergency reporting header 1301, denoting the emergency reporting software 107 has been selected. To the bottom of the IVI system GUI 1300 is the home button 502. Home button 502 exits the emergency reporting software 104, returning the user back to the IVI system GUI landing page. Additionally, in one embodiment to the right of the emergency navigation header 501 is the username and avatar 503. Username and avatar enable additional functionality to facilitate user identification for data transmission.

Far left of the IVI system GUI 1300 display are user input selections, identified by single-touch icons operating within the emergency navigation software 104 or firmware 105 identified by a series of icons starting with a hospital 504, school 505, policeman 506 or fireman 507.

After user selects an icon from the IVI system GUI 1300, the icon in one embodiment, will illuminate in a blue color denoting it has been selected. Additionally, an emergency reporting header 1301 is displayed, along with a pre-configured user-input selectable symptom table 1302 from the IVI system GUI 1300 that defines common report types. In one embodiment, a multitude of symptoms have been defined by the user-input from the selectable symptom table 1302 including but not limited to traffic accident 1304, road obstruction 1305, missing person 1306, tornado 1307, bomb threat 1308, kidnapping 1309, nuclear disaster 1310, tsunami 1311, shooting 1312, domestic abuse 1313, welfare check 1314 and larceny 1315.

Figure 14:
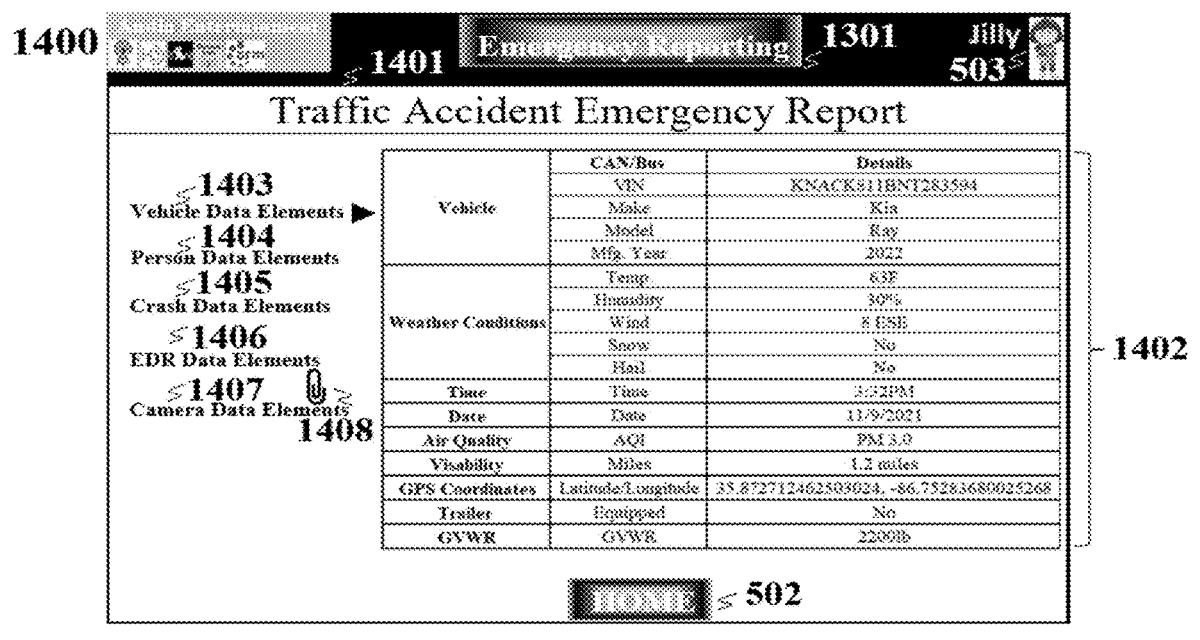

Referring now to FIG. 14, a mockup of an IVI system GUI 1400 displaying a standardized report format in the form of a traffic accident emergency report 1401. IVI system GUI 1400 is operational with improved IVI system 100, equipped with the emergency navigation software 104 or firmware 105 and emergency reporting software 107.

In one embodiment, to the top of the IVI system GUI 1400 is an emergency reporting header 1301 included with the traffic accident emergency report 1401, indicating the displayed IVI system GUI 1400 is operating within the emergency reporting software 107. To the bottom of the IVI system GUI 1400 is the home button 502. Home button 502 exits the traffic accident emergency report 1401, returning the user back to the IVI system GUI landing page. Additionally, in one embodiment to the right of the emergency reporting header 1301 is the username and avatar 503. Username and avatar enable additional functionality to facilitate user identification for data transmission of emergency reporting data elements.

Additionally, IVI system GUI 1400 includes an emergency reporting header 1301 included with a traffic accident emergency report 1401 that indicates the GUI display includes a standardized report capturing vehicle data element subfields 1402 as defined within NHSTA's MMUC 5$^{th}$ edition report template. Left of the data element subfields are the data element headers including vehicle data elements 1403, person data elements 1404, crash data elements 1405, EDR data elements 1406 and camera data elements 1407. In one embodiment, an arrow or triangle pointing to the data element subfields indicates a particular data element has been selected.

In some embodiments, data element subfields may be populated automatically by retrieving data from the vehicle's CANBus network. In yet other embodiments, data element subfields may be manually entered. Additionally, attachments included with reports such as the traffic accident emergency report 1401, which do not have an automatic emergency report event 1203, may facilitate the manual attaching of data files obtained from the vehicle's CANBus network, from data element headers such as EDR data elements 1406 or vehicle camera data elements 1407. A paperclip icon 1408 is displayed for manual attachment of user-selected data file attachments within an emergency report. In other embodiments, paperclip icon 1408 may not be necessary. For automatic emergency report events 1203, data attachments may automatically be attached within the report and transmitted out.

Figure 15:
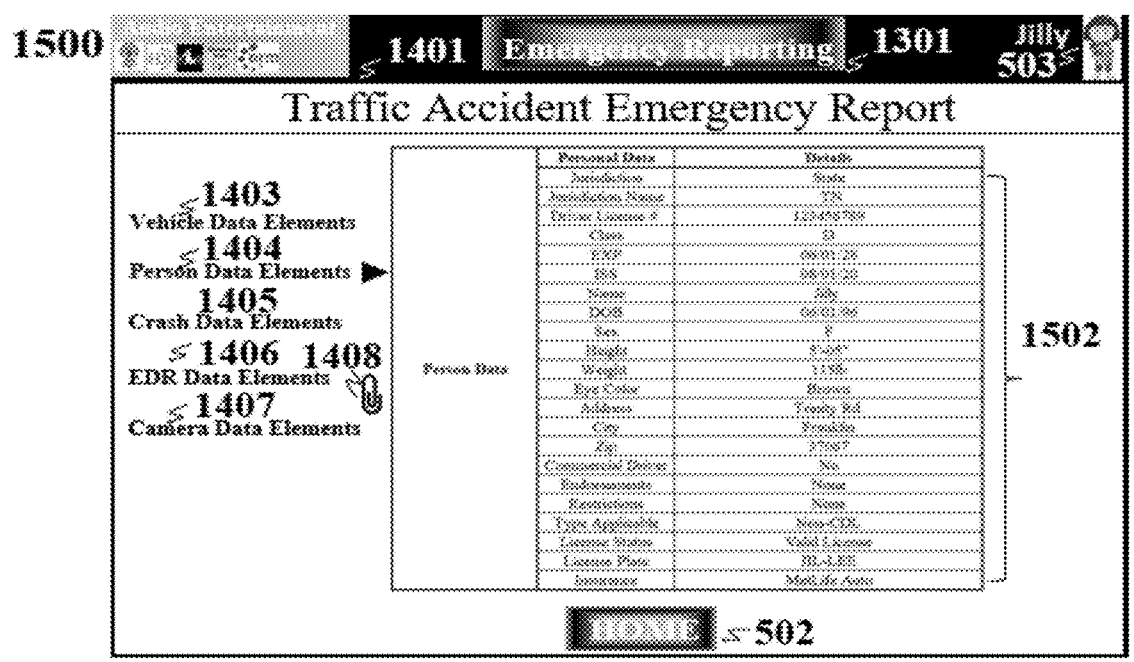
FIG. 15 is a mockup of an IVI system GUI display of a traffic accident emergency report with vehicle data elements in tabular format.

Referring now to FIG. 15, a mockup of an IVI system GUI 1500 displaying a standardized traffic accident emergency report 1401 with person data element subfields 1502. IVI system GUI 1500 is operational with improved IVI system 100, equipped with the emergency navigation software 104 or firmware 105 and emergency reporting software 107.

In one embodiment, to the top of the IVI system GUI 1500 is an emergency reporting system header included with traffic accident emergency report 1401, indicating the displayed IVI system GUI 1500 is operating within the emergency reporting software 107. To the bottom of the IVI system GUI 1500 is the home button 502. Home button 502 exits the traffic accident emergency report 1401, returning the user back to the IVI system GUI landing page. Additionally, in one embodiment to the right of the emergency reporting header 501 is the username and avatar 503. Username and avatar enable enhanced functionality to facilitate user identification for data collection included with report transmission of emergency reporting data elements.

Additionally, IVI system GUI 1500 includes an emergency reporting header 1301 included with traffic accident emergency report 1401 that indicates the emergency reporting software 107 is enabled. GUI display includes a standardized report capturing person data element subfields 1502, defined within NHSTA's MMUC 5$^{th}$ edition report template, including the user-inputted data elements of jurisdiction, jurisdiction name, driver license number, license class, license expiration date, ISS date, endorsements, username, date of birth, sex, height, weight, eye color, address, city, zip code, commercial driver validation, endorsements, restrictions, type applicable, license status, license plate number and insurance provider. Left of the person data element subfields 1502 are the data element headers vehicle data elements 1403, person data elements 1404, crash data elements 1405, EDR data elements 1406 and camera data elements 1407. In one embodiment, an arrow or triangle to the right of person data elements 1404 points to the person data elements subfields 1502, indicating a particular data element has been selected.

In one embodiment, person data element subfields 1502 are populated from user defined data obtained from IVI system emergency navigation log-in 1202. Improved IVI system 100 may store key person data elements 1502 from the onboard memory 101 or data storage 111. Person data elements may include, but not limited to state license data subfields, insurance provider, insurance policy number, medication information, or any other subfield aiding first responders in an emergency event.

In other embodiments, person data elements 1404 may be manually entered from improved IVI system 100 or omitted from the emergency report transmission entirely.

Figure 16:
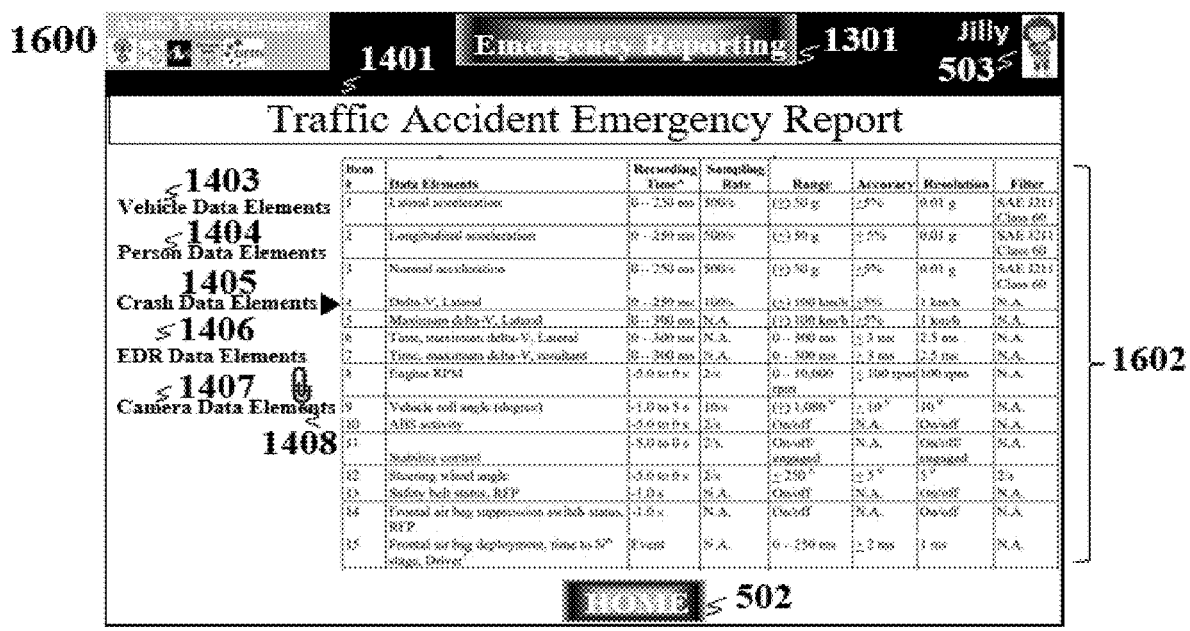
FIG. 16 is a mockup of an IVI system GUI display of a traffic accident emergency report with EDR data elements in tabular format.

Referring now to FIG. 16, a mockup of an IVI system GUI 1600 displaying a standardized traffic accident emergency report 1401 with EDR data element subfields 1602. IVI system GUI 1600 is operational with improved IVI system 100, equipped with the emergency navigation software 104 or firmware 105 and emergency reporting software 107.

In one embodiment, to the top of the IVI system GUI 1600 is an emergency reporting system header included with traffic accident emergency report 1401, indicating the displayed IVI system GUI 1600 is operating within the emergency reporting software 107. To the bottom of the IVI system GUI 1600 is the home button 502. Home button 502 exits the traffic accident emergency report 1401, returning the user back to the IVI system GUI landing page. Additionally, in one embodiment to the right of the emergency reporting header 1301 is the username and avatar 503. Username and avatar enable additional functionality to facilitate user identification for data transmission of emergency reporting data elements.

Additionally, IVI system GUI 1600 includes an emergency reporting header 1301 included with traffic accident emergency report 1401 that indicates the emergency reporting software 107 is enabled. GUI display includes a standardized report capturing crash data element subfields 1602 defined within NHSTA's MMUC 5$^{th}$ edition report template. Left of the crash data element subfields 1602 are the data element headers vehicle data elements 1403, person data elements 1404, crash data elements 1405, EDR data elements 1406 and camera data elements 1407. In one embodiment, an arrow or triangle to the right of crash data elements 1405 points to the crash data elements subfields 1602, indicating a particular data element has been selected.

In one embodiment, crash data element subfields 1602 are populated directly from the vehicle's EDR 114 operating over the vehicle's CANBus network. Crash data element subfields 1602 are reported as defined by the current MMUC report template. Crash data element subfields 1602 may not encompass all EDR 114 data collected at the time of an emergency report event and may omit other key data element subfields falling outside of the direct requirements detailed in NHSTA's MMUC 5$^{th}$ edition report template. Therefore, additional data subfields captured by the EDR 114, but outside of the current MMUC 5$^{th}$ edition report template, may also be included in transmissions with selection of EDR data elements 1406.

Figure 17:
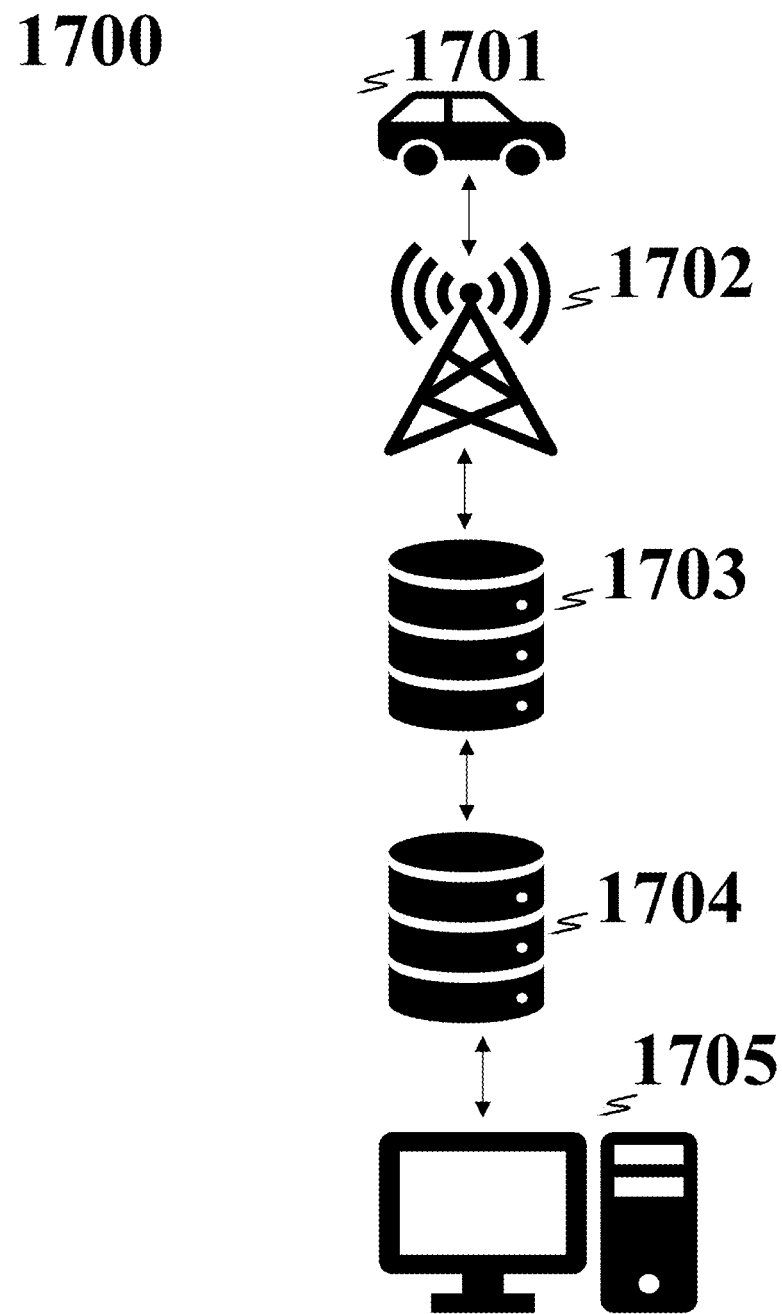
FIG. 17 is the functional block diagram of an exemplary improved IVI system and method to transmit user-selected medical specialty, medical specialist and an available date and time from a pre-configured single-touch touchscreen GUI.

Referring now to FIG. 17, an exemplary system 1700 that facilitates medical appointment scheduling from a pre-configured GUI displayed onto an improved IVI system 100 equipped with the emergency navigation software 104 or firmware 105 and the appointment scheduler 108 software.

In one embodiment, driven vehicle 1701 transmits user inputted data received from touchscreen selections from a plurality of pre-configured GUI configurations including, but not limited to medical specialty, medical specialist, date and time of scheduled appointment. Data transmitted out from driven vehicle 1701 is received by a cellular tower 1702 and transmitted out to an appointment scheduling database 1703. Appointment scheduling database 1703 stores user-selected data and transmits out to the individual medical service providers scheduling system database 1704. Additionally, medical service providers scheduling system database 1704 may be displayed on a connected medical service electronic device 1705.

Figure 18:
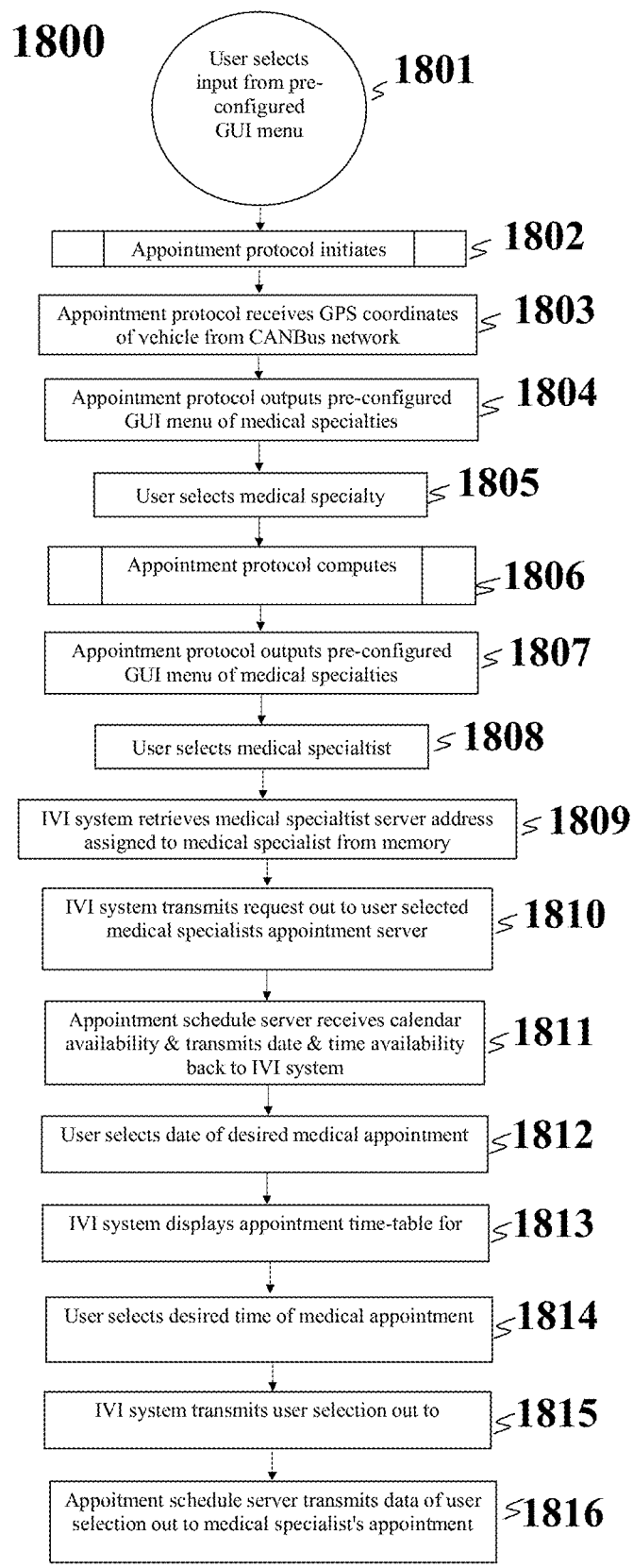
FIG. 18 is a flow diagram that illustrates an improved IVI system and method that facilitates scheduling a date and time for a medical specialist within a medical specialty from a pre-configured touchscreen GUI out to a medical specialist's appointment server.

Referring now to FIG. 18, an improved methodology 1800 that facilitates transmission of medical appointment scheduling via user-selected inputs displayed onto a pre-configured GUI menu from an improved IVI system 100 equipped with emergency navigation software 104 or firmware 105 and emergency reporting software 107. Coupled with improved IVI system 100 user log-in information, the appointment scheduler facilitates communication with a medical specialist's appointment server, aiding both the user and the medical specialists to fill the appointment calendar.

Methodology starts with user selects input from pre-configured GUI menu 1801. User inputs received may initiate appointment scheduler software 108. Methodology transitions to appointment protocol initiates 1802. Methodology then transitions to appointment protocol receives GPS coordinates of vehicle from CANBus network 1803, with GPS coordinates derived from improved IVI system 100 GPS module. Methodology then transitions to appointment protocol outputs pre-configured GUI menu of medical specialties 1804. From the pre-configured GUI menu of medical specialties 1804, methodology transitions to user selects medical specialty 1805.

After the user selects medical specialty 1805, the methodology then transitions to appointment protocol computes nearby medical specialists 1806. Appointment protocol uses the vehicle's current GPS position and filters for medical specialists by distance away from the medical specialist's static GPS coordinate location. Methodology then transitions to appointment protocol outputs pre-configured GUI menu of medical specialties 1807 onto the IVI system. Methodology then transitions to user selects medical specialist 1808 from the pre-configured menu of medical specialists. Methodology then transitions to IVI system retrieves medical specialist server address assigned to medical specialist from memory 1809. A data file with data elements including medical specialists with accompying medical specialist server address is retrieved from memory.

After the IVI system retrieves medical specialist server address assigned to medical specialist from memory 1809, methodology then transitions to the IVI system transmits request out to user-selected medical specialists' appointment schedule server 1810. Methodology then transitions to medical specialists' appointment schedule server receives calendar availability and transmits date and time availability back to IVI system 1811.

After receiving date and time availability, methodology transitions to IVI system GUI displays a pre-configured GUI display of a calendar whereby a user selects date of desired medical appointment 1812. Methodology then transitions to an IVI system preconfigured GUI displays an appointment time table whereby a user selects desired time of medical appointment 1812. In one embodiment, only available appointment times are displayed. Other embodiments, appointment times may display a color-coded highlights or strikethrough text to visually display time is unavailable for selection.

After the user selects date of desired medical appointment 1812, methodology transitions to IVI system displays appointment time-table for medical specialist availability 1813. Methodology transitions to user selects desired time of medical appointment 1814. After user selection is received, IVI system transmits user selection out to appointment schedule server 1815. Methodology then transitions to the appointment schedule server transmits data of user selection out to medical specialist's appointment server 1816.

Figure 19:
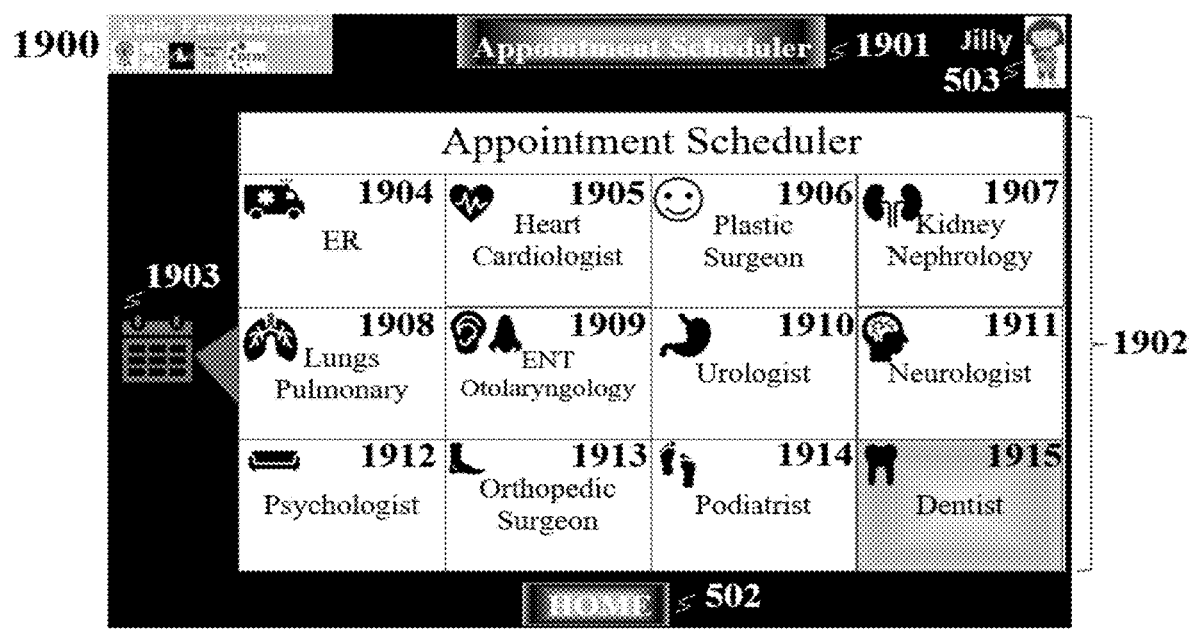
FIG. 19 is a mockup of an improved IVI system touchscreen GUI with single touch iconography facilitating the display of an appointment scheduler in tabular format including pre-configured single-touch menu for selecting a medical specialty.

Referring now to FIG. 19, a mockup of an IVI system GUI 1900 that facilitates the emergency navigation software 104 or firmware 105 and appointment scheduler software 108 for manual selection of a medical specialty from a pre-configured tabular display.

Atop the middle of the IVI system GUI 1900 is the appointment scheduler header 1901, denoting the emergency navigation software 104 or firmware 105 and appointment scheduler software 108 has been selected. To the bottom of the IVI system GUI 1900 is the home button 502. Home button 502 exits the appointment scheduler software 108, returning the user back to the IVI system GUI landing page. Additionally, in one embodiment to the right of the appointment scheduler header 1901 is the username and avatar 503. Username and avatar enable additional functionality to facilitate user identification for data transmission and identifying stored insurance information.

In one embodiment, below appointment scheduler header 1901, an appointment scheduler table 1902 is displayed, along with a pre-configured user-input selectable medical specialty table including but not limited to ER 1904, heart cardiologist 1905, plastic surgeon 1906, kidney nephrology 1907, lungs pulmonary 1908, ENT otolaryngology 1909, urologist 1910, neurologist 1911, psychologist 1912, orthopedic surgeon 1913, podiatrist 1914 and dentist 1915. Selectable symptoms include a text and icon providing a visual representation relating to each separate medical appointment specialty for display in the upper left-hand corner of the table cell associated to each specialty.

Far left of the IVI system GUI 1900 display are user input selections, identified by single-touch icons operating within the appointment scheduler software 108 identified by calendar icon 1903.

After user selects an icon from the IVI system GUI 1900, the calendar icon 1903 will illuminate in a blue color denoting a medical specialty has been selected. When calendar icon 1903 is highlighted in blue, appointment scheduler table 1902 is available to receive user selection from the input interface 112. In one embodiment, user selection of the pre-configured symptom user-input will highlight the symptom dentist 1915.

Figure 20:
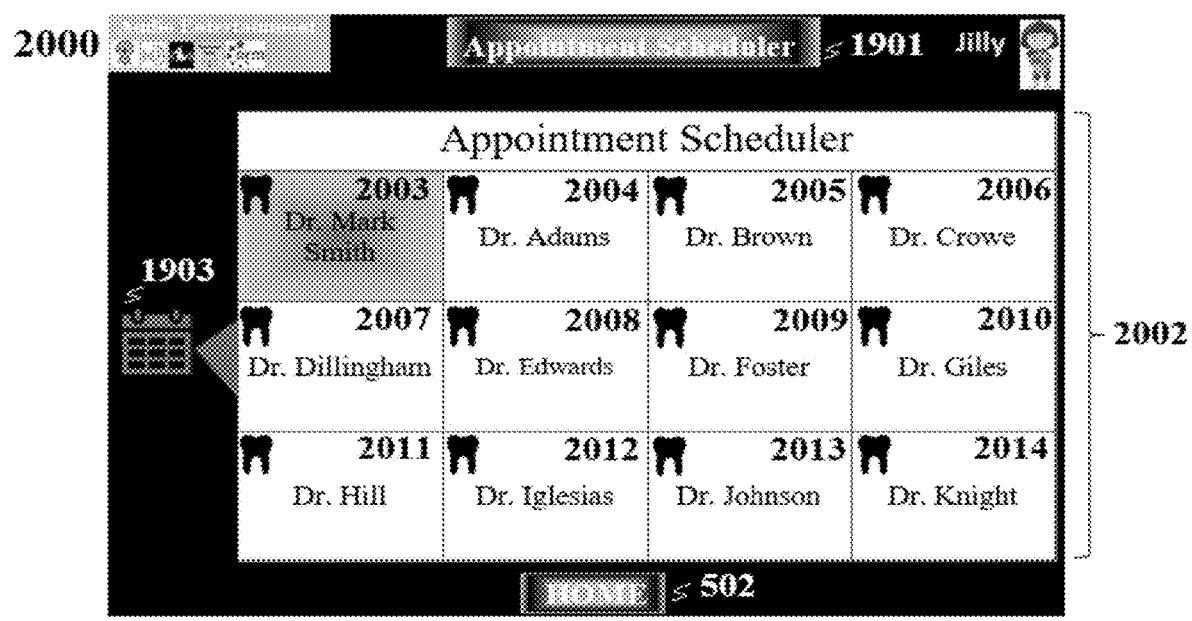
FIG. 20 is a mockup of an improved IVI system touchscreen GUI with single touch iconography facilitating the display of an appointment scheduler in tabular format including pre-configured single-touch menu for selecting a medical specialist, within the selected medical specialty.

Referring now to FIG. 20, a mockup of an IVI system GUI 2000 that facilitates the emergency navigation software 104 or firmware 105 and appointment scheduler software 108 for manual selection of a medical specialist from a pre-configured tabular display.

Atop the middle of the IVI system GUI 2000 is the appointment scheduler header 1901, denoting the emergency navigation software 104 or firmware 105 and appointment scheduler software 108 has been selected. To the bottom of the IVI system GUI 1900 is the home button 502. Home button 502 exits the appointment scheduler software 108, returning the user back to the IVI system GUI landing page. Additionally, in one embodiment to the right of the appointment scheduler header 1901 is the username and avatar 503. Username and avatar enable additional functionality to facilitate user identification for data transmission and identifying stored insurance information, in-network insurance coverage and prescription insurance information.

In other embodiments, personal stored insurance information may be used to filter medical specialists by insurance network providers, distance from home, prescription coverage or specialty of medical provider.

In one embodiment, below appointment scheduler header 1901 an appointment scheduler table 2002 is displayed, along with a pre-configured user-input selectable medical specialist table including but not limited to Dr. Mark Smith 2003, Dr. Adams 2004, Dr. Brown 2005, Dr. Crow 2006, Dr. Dillingham 2007, Dr. Edwards 2008, Dr. Foster 2009, Dr. Giles 2010, Dr. Hill 2011, Dr. Iglesias 2012, Dr. Johnston 2013 and Dr. Knight 2014. Selectable medical specialists include text and an icon providing a visual representation relating to each medical specialty in the upper left-hand corner of the table cell associated to each medical specialist.

Far left of the IVI system GUI 2000 display are user input selections, identified by single-touch icons operating within the appointment scheduler software 108 identified by calendar icon 1903.

After user selects an icon from the IVI system GUI 2000, the calendar icon 1903 will illuminate in a blue color denoting a medical specialist has been selected. When calendar icon 1903 is highlighted in blue, appointment scheduler table 1902 is available to receive user selection from the input interface 112. In one embodiment, user selection Dr. Mark Smith 1904 will highlight from the pre-configured medical specialist menu.

Figure 21:
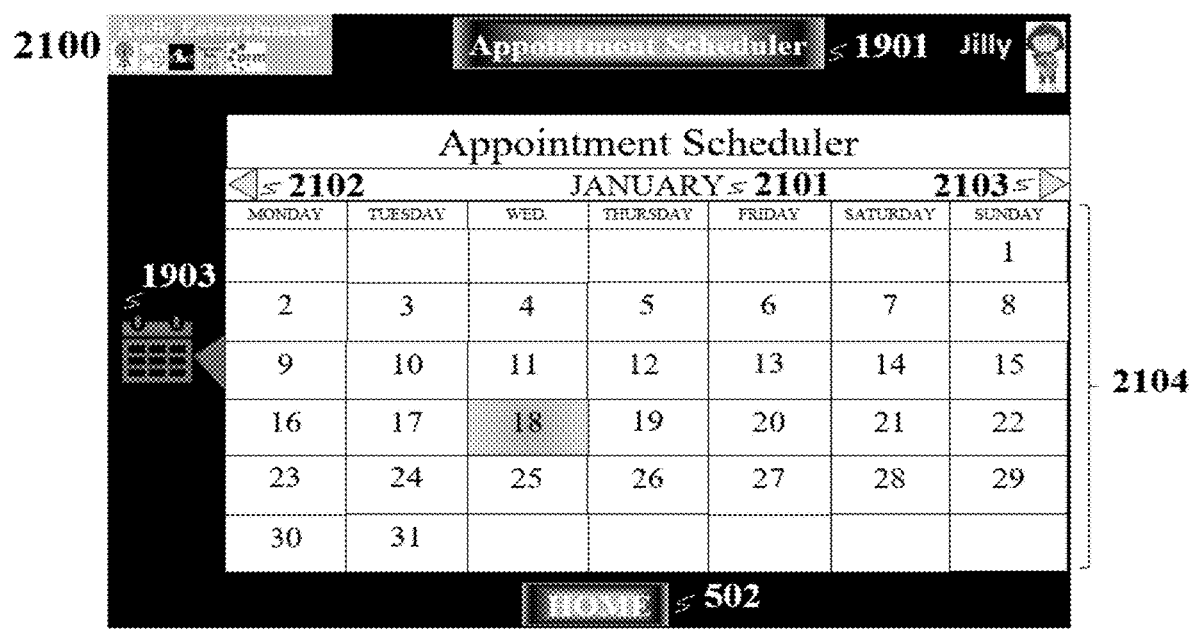
FIG. 21 is a mockup of an improved IVI system touchscreen GUI with single touch iconography facilitating the display of a medical specialist's appointment date scheduler in tabular format including pre-configured single-touch menu for selecting a date.

Referring now to FIG. 21, a mockup of an IVI system GUI 2100 that facilitates the emergency navigation software 104 or firmware 105 and appointment scheduler software 108 for manual selection of an appointment date for a medical specialist from a pre-configured tabular GUI display.

Atop the middle of the IVI system GUI 2100 is the appointment scheduler header 1901, denoting the emergency navigation software 104 or firmware 105 and appointment scheduler software 108 has been selected. When calendar icon 1903 is highlighted in blue, medical specialist appointment time table 2104 is available to receive user selection from the input interface 112.

To the bottom of the IVI system GUI 2100 is the home button 502. Home button 502 exits the appointment scheduler software 108, returning the user back to the IVI system GUI landing page. Additionally, in one embodiment to the below the appointment scheduler header 1901 is the month displayed on calendar 2101. User selects month by single-touch icon arrows denoted by the left arrow icon 2102, which reverts the calendar display to the month prior. Right arrow icon 2103, advances the calendar display to the next month. Additionally, in one embodiment to the right of the appointment scheduler header 1901 is the username and avatar 503. Username and avatar 503 enable additional functionality to facilitate user identification for data transmission.

In one embodiment, below the calendar header 2101 a calendar date table 2104 is displayed, along with a pre-configured calendar menu facilitating single-touch user-input selection of a date icon. After user selects an icon from the IVI system GUI 2100, the calendar date icon from calendar date table 2104 will illuminate in a blue color denoting a date has been selected.

Figure 22:
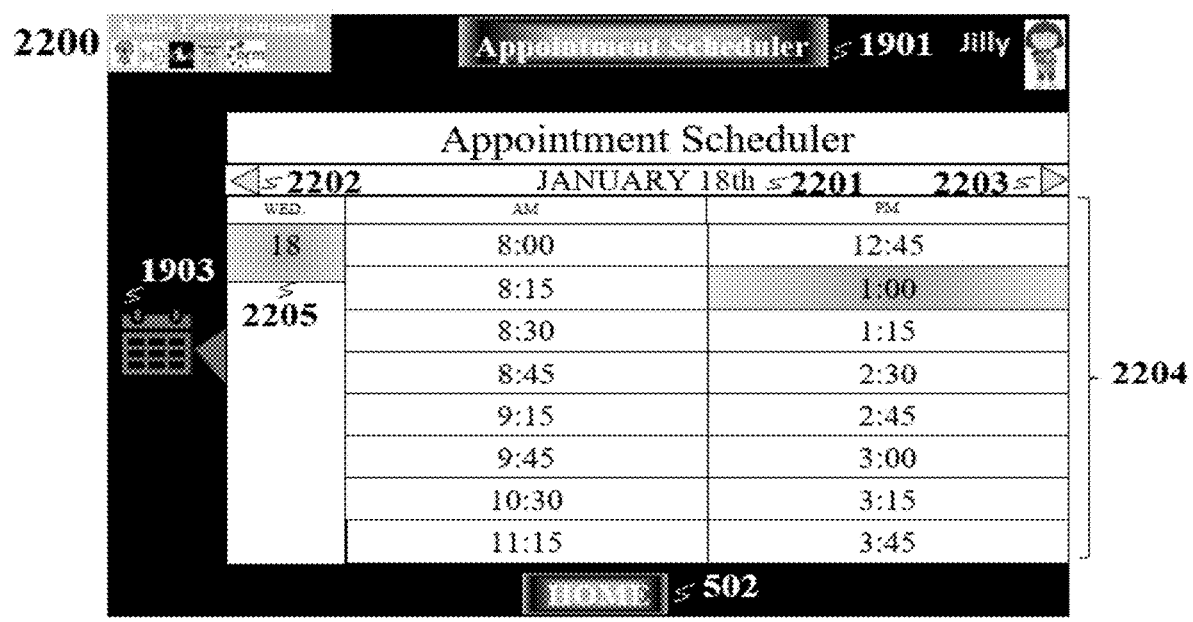
FIG. 22 is a mockup of an improved IVI system touchscreen GUI with single touch iconography facilitating the display of an IVI system touchscreen GUI, equipped to display a medical specialists appointment time scheduler in tabular format including pre-configured single-touch menu for selecting a time, within the date previously selected.

Referring now to FIG. 22, a mockup of an IVI system GUI 2200 that facilitates the emergency navigation software 104 or firmware 105 and appointment scheduler software 108 for manual selection of an appointment time of a medical specialist from a pre-configured tabular display.

Atop the middle of the IVI system GUI 2200 is the appointment scheduler header 1901, denoting the emergency navigation software 104 or firmware 105 and appointment scheduler software 108 has been selected. When calendar icon 1903 is highlighted in blue, medical specialist appointment time table 2204 is available to receive user selection from the input interface 112.

To the bottom of the IVI system GUI 2200 is the home button 502. Home button 502 exits the appointment scheduler software 108, returning the user back to the IVI system GUI landing page. Additionally, in one embodiment, below the appointment scheduler header 1901 is the month and date header 2201. From the date header 2201, user selects date by single-touch icon arrows denoted by the left arrow icon 2202, which reverts the date display to the day prior. Right arrow icon 2203 advances the display to the next day. Additionally, in one embodiment to the right of the appointment scheduler header 1901 is the username and avatar 503. Username and avatar 503 enable additional functionality to facilitate user identification for data element transmission.

In one embodiment, below the month and date header 2201 a pre-configured single-touch appointment time table 2204 is displayed. After user selects a time from the medical specialist appointment time table 2204, the selected time will illuminate in a blue color denoting a time has been selected. Additionally, to left of the pre-configured single-touch appointment time table 2204 is the user-selected date and day of the week 2205. User-selected date and day of the week 2205 appears in a separate column and is illuminated in a blue color.

Figure 23:
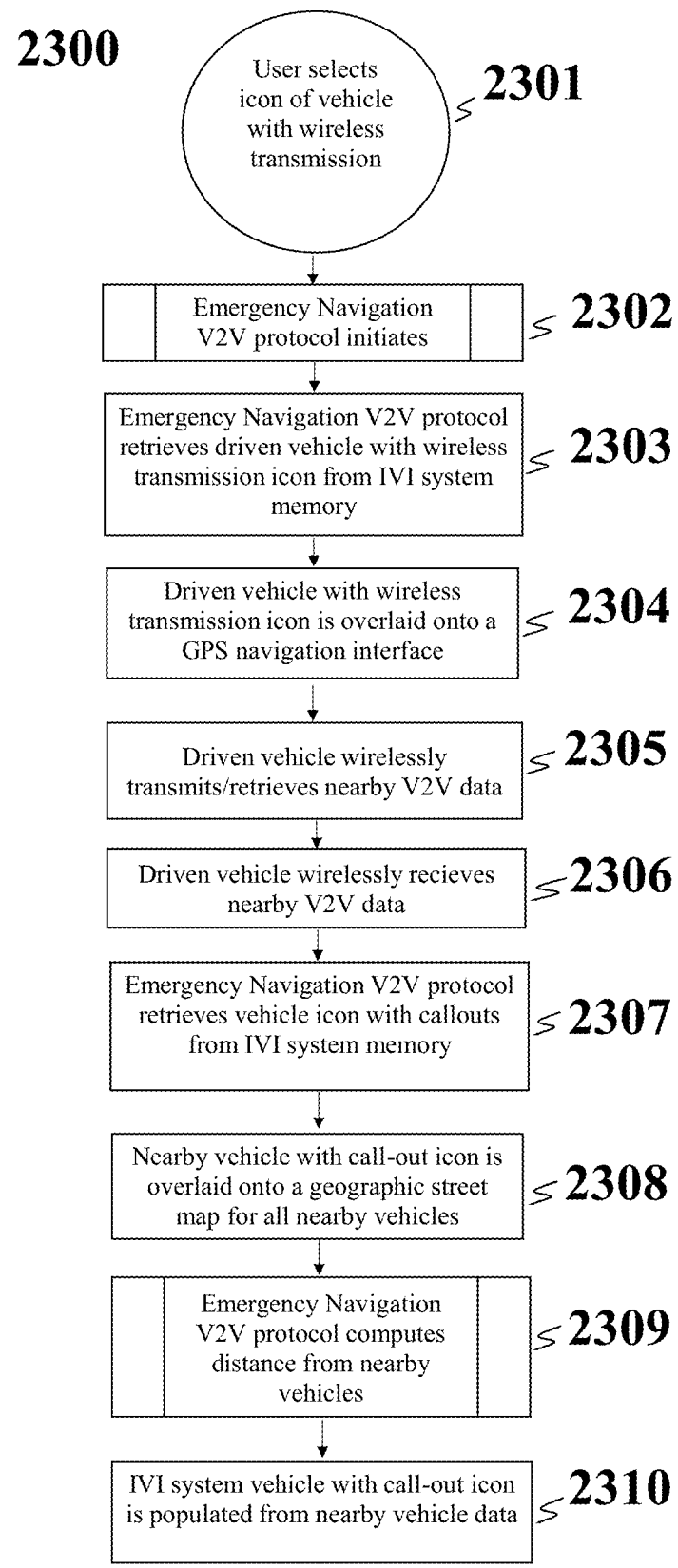
FIG. 23 is a flow diagram that illustrates an improved IVI system and method to display nearby vehicle data elements transmitted using V2V communication, including but not limited to route distance and estimated drive time onto a color-coded callout icon on a GUI.

Referring now to FIG. 23, an improved methodology 2300 that facilitates an enhanced display for improved IVI system 100 equipped with emergency navigation software 104 or firmware 105 to display nearby vehicles via a plurality of vehicle icons with callouts overlaid onto a GPS navigation interface. Data inputted into callout includes wireless V2V communication data received from nearby vehicles and computed distance from nearby vehicle.

Methodology starts with user selects icon of vehicle with wireless transmission 2301 from the IVI system GUI. Methodology transitions to emergency navigation V2V protocol initiates 2302. Methodology then transitions to emergency navigation V2V protocol retrieves driven vehicle with wireless transmission icon from IVI system memory 2303. Methodology then transitions to emergency navigation V2V protocol displaying driven vehicle with wireless transmission icon is overlaid onto a GPS navigation interface 2304.

Methodology then transitions to driven vehicle wirelessly transmits and retrieves nearby V2V data 2305. In other embodiments a separate protocol to request nearby vehicle data may be included. Methodology transitions to driven vehicle wirelessly receives nearby V2V data 2306. Data received includes, but is not limited to speed as obtained from nearby vehicle's speedometer, vehicle identification, make, model, color, model year and direction of travel.

Methodology transitions to emergency navigation V2V protocol retrieves vehicle icon with callouts from IVI system memory 2307. Methodology then transitions to nearby vehicle with callout icon is overlaid onto a GPS navigation interface for all nearby vehicles 2308. Methodology then transitions to emergency navigation V2V protocol computes distance from nearby vehicles 2309. Computed distance is derived from the distance between the driven and nearby vehicle GPS coordinates which are similarly equipped with a GPS module 110. After the computed distance is derived from the distance between the driven and nearby vehicle GPS coordinates, which are similarly equipped with a GPS module 110, methodology transitions to IVI system vehicle with callout icon is populated from nearby vehicle data 2310. Data elements inside the callout may include computed or received V2V data elements.

Figure 24:
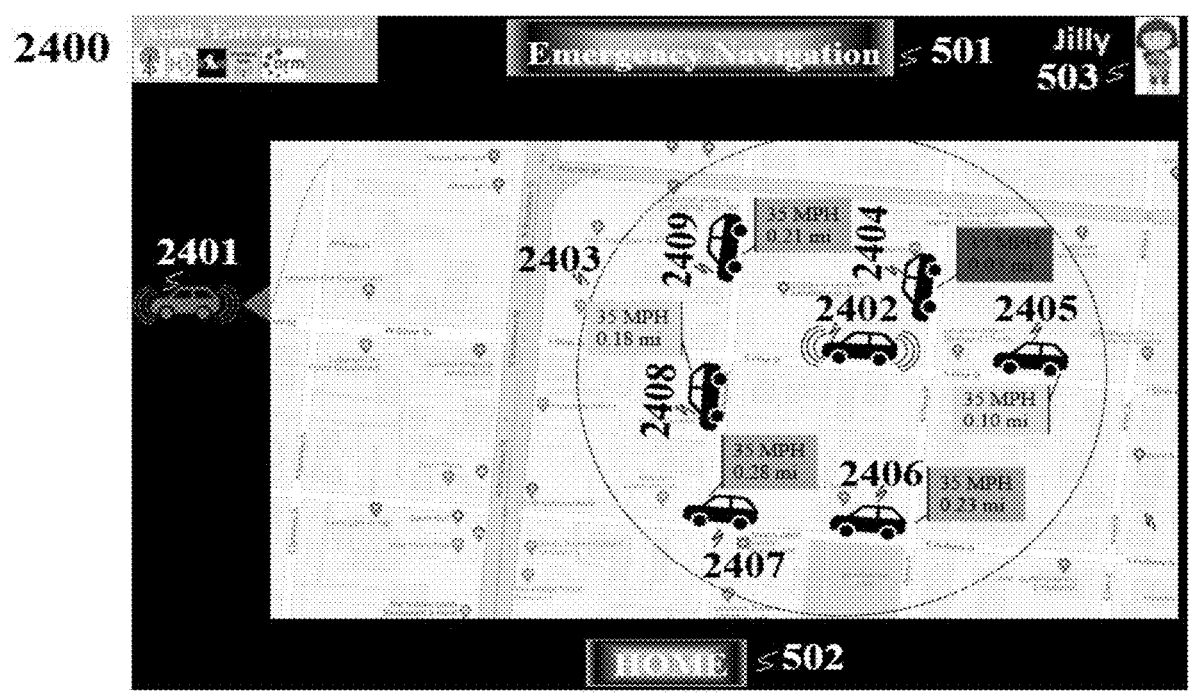
FIG. 24 is a mockup of an improved IVI system touchscreen GUI, equipped to display a plurality of icons, including nearby vehicles with color-coded callouts representative of vehicles detected via V2V communication and an icon of the driven vehicle overlaid onto a geographic street map.

Referring now to FIG. 24, a mockup of an IVI system GUI 2400 that facilitates an enhancement to the emergency navigation software 104 or firmware 105 for emergency navigation collision avoidance. Atop of the IVI system GUI 2400 is the emergency navigation header 501 is displayed, denoting the emergency navigation software 104 or firmware 105 is operating. To the bottom of the IVI system GUI 2400 is the home button 502. Home button 502 exits the emergency navigation software 104 or firmware 105, returning the user back to the IVI system GUI landing page. Additionally, in one embodiment to the right of the emergency navigation header 501 is the username and avatar 503. Username and avatar 503 enable additional functionality to facilitate user identification for data transmission.

Far left of the IVI system GUI 2400 display is a user input selection, identified by single-touch vehicle with radio waves emitting icon 2401, operating within the emergency navigation software 104 or firmware 105. Vehicle with wireless transmission emitting icon 2401 represents a visual display onto IVI system GUI 2400 for nearby vehicles omitting a V2V signal.

After user selects the vehicle with wireless V2V transmission emitting icon 2401 from the IVI system GUI 2400, the vehicle with wireless V2V transmission emitting icon 2401 in one embodiment, will illuminate in a blue color denoting it has been selected. After user-input for selection of the vehicle with wireless V2V transmission emitting icon 2401 has been received, the driven vehicle is overlaid onto a GPS navigation interface display, identified by a vehicle icon with wireless V2V transmission 2402. Overlaid vehicle icon with wireless V2V transmission 2402 displays a V2V reception circle 2403 with a symmetrical omni-directional radius centered on the driven vehicle.

Within the overlaid circle are all nearby vehicles similarly equipped with a wireless V2V transmitter. In one embodiment, the driven vehicle with wireless V2V transmission and adjoining callout icon 2402 is displayed onto IVI system GUI 2400 with V2V reception circle 2403, whereby other similarly equipped vehicles with a V2V transmitter and receiver 116 are displayed by a vehicle with callout icon. In one embodiment, vehicle and callout icons 2404, 2405, 2406, 2407, 2408 are equipped with a wireless V2V transmitter and are actively transmitting data including, but not limited to the vehicle's speed as derived from the nearby vehicle's CANBus network and distance from the driven vehicle with wireless V2V transmission and adjoining callout icon 2402.

Additionally, data to be transmitted from nearby vehicles similarly equipped with a V2V transmitter and receiver 116 may include additional data elements not displayed into the callout icons 2404, 2405, 2406, 2407 and 2408. In other embodiments, data for nearby vehicles equipped with V2V transmitters may be retained within a data table stored onto the improved IVI system 100, without full display onto IVI system GUI 2400.

Figure 25:
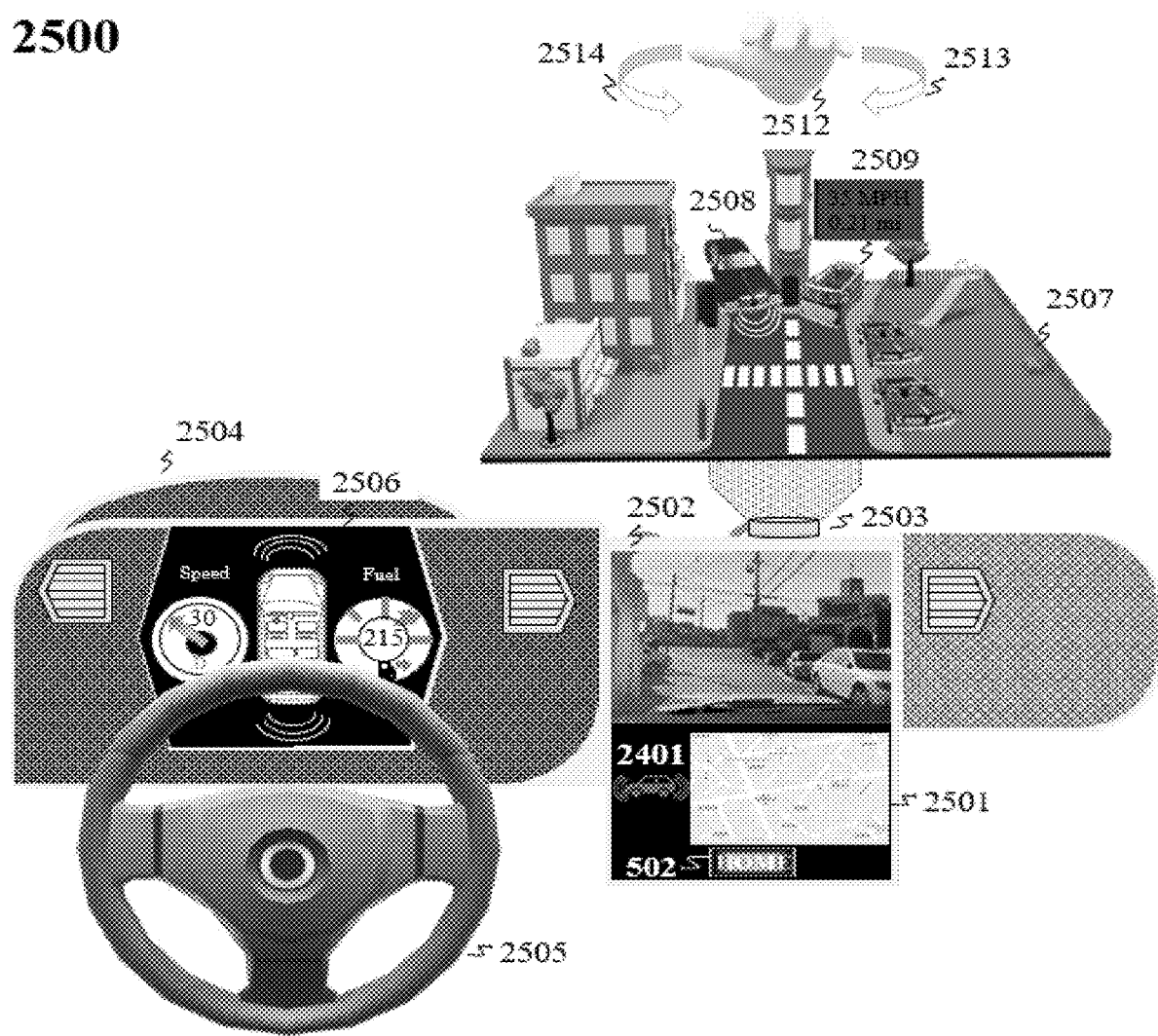
FIG. 25 is a mockup of an instrument panel and improved IVI system equipped with a holographic module facilitating display of a plurality of 3D icons, including nearby vehicles with color-coded callouts representative of vehicles detected via V2V communication and an icon of the driven vehicle overlaid onto a 3D GPS navigation interface.

Referring now to FIG. 25, a mockup of an IVI system GUI 2500 that facilitates a holographic three-dimensional (3D) display enhancement to the emergency navigation software 104 or firmware 105 for emergency navigation collision avoidance. In one embodiment, improved IVI system 100, equipped with holographic module 117 facilitates a 3D holographic display of the driven vehicle and nearby vehicles with callouts including nearby V2V data and computations derived from the emergency navigation V2V protocol.

In one embodiment, IVI system GUI 2500 starts with the single touch user-selectable iconography of a vehicle with wireless V2V transmission emitting icon 2401 displayed onto the bottom portion of a split screen of the IVI system 100. To the right of the vehicle with wireless V2V transmission emitting icon 2401 is a GPS navigation interface 2501. Below the GPS navigation interface is the home button 502. In some embodiments, the upper portion of the split screen includes a front facing camera display 2502, providing the driver with a real time front facing camera display.

Atop of improved IVI system 100, equipped with holographic module 117, is the holographic lens assembly 2503. In other embodiments, hologram lens assembly 2503 may not be visible and housed inside improved IVI system 100. Improved IVI system 100 is in one embodiment encased within vehicle's instrument panel 2504. Vehicle's steering wheel 2505 is also detailed in one embodiment along with an instrument cluster 2506 encased within instrument panel 2504. Instrument cluster 2506 digital display may also include the vehicle with wireless V2V transmission emitting icon 2401, denoting the V2V display is enabled.

Above instrument panel 2504 and directly above the hologram lens assembly 2503, is a 3D display of a static GPS navigation interface 2507. 3D display of a static GPS navigation interface 2507 in some embodiments is represented by fully rendered 3D shapes and objects including, but not limited to buildings, trees, vehicles and any other static objects. In other embodiments, the 3D shapes and objects will be represented by a 3D mesh, without rendering. Static GPS navigation interface 2507, in one embodiment, can be received and displayed from a static 3D data file format.

Included on the 3D display of a GPS navigation interface 2507 is a 3D rendering of the driven vehicle with wireless V2V transmission icon 2508. Driven vehicle with wireless V2V transmission icon 2508 is dynamic as the driven vehicle's GPS coordinates may move relative to GPS coordinate positioning on the static 3D display of a GPS navigation interface 2507.

Also included on the GPS navigation interface 2507 are all nearby vehicles similarly equipped with a V2V transmitter and receiver 116. In one embodiment, nearby vehicles are represented by a 3D rendering of a vehicle and callout icon 2509. Data inside the callout icon may include all data received from the nearby vehicle's V2V transmitter including but not limited to the speed as derived from the nearby vehicle's CANBus network, vehicle identification, make, model, color, model year and direction of travel. Additionally, with computations derived from the emergency navigation V2V protocol, distance from the driven vehicle with wireless V2V transmission may be derived.

In one embodiment callout icon is color coordinated with distance proximity from driven vehicle. Red denoting a very close proximity range for nearby vehicles. In other embodiments, callout color may be dynamic and change with the proximity between driven and nearby vehicle.

Above the 3D display of a GPS navigation interface 2507 is a 3D rendering of a hand icon 2512 positioned from the front view. In one embodiment, user may position their hand over the 3D rendering of a hand icon 2512 and articulate their hand accordance to the right directional arrow 2513 and left directional arrow 2514 for full 360° rotation to change the holographic 3D rendering display.

What is claimed is:

1. An in-vehicle infotainment (IVI) system of a vehicle, the system comprising:
   a processing unit;
   a display screen;
   a memory unit;
   a plurality of communication interfaces; and
   a set of non-transitory instructions stored in the memory unit, that, when executed by the processing unit causes the system to:
   connect to an external server;
   receive a data file from the external server containing data elements for a plurality of emergency destinations;
   retrieve a fuel range of the vehicle from a CAN Bus network of the vehicle;
   receive input to activate emergency navigation;
   parse out the data elements from the data file;
   store the data file as a data table in the memory unit;
   retrieve static global positioning system (GPS) coordinates from the memory unit for the plurality of emergency destinations;
   receive dynamic GPS coordinates for the vehicle;
   calculate a route distance and drive time between the vehicle and each of the plurality of emergency destinations;
   update the data table with the route distance and the drive time associated with each of the plurality of emergency destinations;
   display, on the display screen, a plurality of icons overlaid on a GPS navigation interface, the plurality of icons representing the plurality of emergency destinations, each icon of the plurality of icons being displayed with at least one of the data elements corresponding to one of the plurality of emergency destinations, and each icon being dynamically color-coded based at least in part on the calculated route distance and drive time relative to the fuel range of the vehicle;

display, on the display screen, type icons each representing one of a plurality of types of emergency destinations;
receive input from a user selecting a hospital type of the plurality of types of emergency destinations;
display, on the display screen, a plurality of symptoms in a table;
receive input from the user selecting at least one of the plurality of symptoms; and
filter the plurality of displayed emergency destinations by specialties relating to the at least one of the plurality of symptoms.

2. The system of claim 1, wherein the at least one of the data elements comprises, the drive time, the route distance, a reported wait time, or a reported capacity.

3. The system of claim 1, further comprising, additional non-transitory instructions stored in the memory unit, that, when executed by the processing unit causes the system to:
receive a request for an emergency report;
retrieve the emergency report formatted for emergency data elements based upon an emergency report type;
receive the emergency data elements from one or more in-vehicle modules;
generate the emergency report based on the emergency report type;
display, on the display screen, the emergency report with the emergency data elements;
attach the emergency data elements to the emergency report; and
transmit the emergency report to the external server.

4. The system of claim 1, further comprising, additional non-transitory instructions stored in the memory unit, that, when executed by the processing unit causes the system to:
display, on the display screen, a calendar icon representing an appointment scheduler;
receive input from a user selecting the calendar icon to initiate the appointment scheduler;
display, on the display screen, a medical specialties table, configured to present a plurality of selectable medical specialties;
receive input from the user selecting a medical specialty;
determine nearby medical specialists providing the medical specialty within a predetermined distance to the vehicle;
display, on the display screen, the nearby medical specialists identified by text and medical iconography of the medical specialty onto the display screen;
receive input from the user selecting a medical specialist from the nearby medical specialists;
request available appointment dates and times from an appointment server of the medical specialist;
receive at least one available appointment date and time;
display, on the display screen, the at least one available appointment date;
receive input from the user selecting an appointment date;
display, on the display screen, at least one available appointment time associated with the appointment date;
receive input from the user selecting an appointment time; and
transmit the appointment date and the appointment time to the appointment server.

5. The system of claim 3, wherein the one or more in-vehicle modules comprises at least one of an event data recorder (EDR), in-vehicle camera(s), vehicle-to-vehicle (V2V) transmitter or holographic module.

6. The system of claim 3, wherein the traffic accident emergency report includes the data elements from at least one in-vehicle modules.

7. The system of claim 1, wherein each icon is dynamically color-coded based further in part on determined changes in traffic patterns.

8. The system of claim 1, further comprising, additional non-transitory instructions stored in the memory unit, that, when executed by the processing unit causes the system to:
display, on the display screen, type icons each representing one of a plurality of types of emergency destinations;
receive input from a user selecting a fuel station type of the plurality of types of emergency destinations;
display, on the display screen, fuel icons each representing one of a plurality of fuel types; and
receive input from the user selecting a type of fuel.

9. The system of claim 8, wherein the plurality of fuel types comprise, a gas pump, an electrical vehicle plug-in, or a hydrogen.

10. The system of claim 8, wherein the at least one of the data elements contains information relating to a fuel station, comprising a name of the fuel station, an estimated time from the fuel station, or a computed distance from the fuel station.

11. The system of claim 10, wherein the at least one of the data elements further comprises at least one of fuel price, hydrogen purity, diesel availability, battery charger specifications, certification of station, or quality verification level.

12. A method for navigation using an in-vehicle infotainment (IVI) system in a vehicle, the method comprising;
connecting to an external server;
receiving a location of the vehicle;
displaying a vehicle icon positioned on the location of the vehicle in a navigation interface on a display in the vehicle;
receiving an aggregate data file comprising a data element for each of a plurality of destinations, wherein the data element comprises a position of a destination;
retrieving a fuel range of the vehicle from a CAN Bus network of the vehicle;
storing the aggregate data file;
computing distance between the vehicle and each of the plurality of destinations;
displaying icons representing each of the plurality of destinations in the navigation interface on the display, each icon being dynamically color-coded based at least in part on the computed distance relative to the fuel range of the vehicle
receiving a request for an emergency report;
retrieving the emergency report formatted for emergency data elements based upon an emergency report type;
receiving the emergency data elements from one or more in-vehicle modules;
generating the emergency report based on the emergency report type;
displaying the emergency report with the emergency data elements;
attaching the emergency data elements to the emergency report; and
transmitting the emergency report to the external server.

13. The method of claim 12, further comprising:
displaying, on the display, icons representing selectable types of destinations;
receiving input from a user selecting a hospital type of destination;

displaying, on the display, a plurality of selectable symptoms in a table;
receiving input from the user selecting at least one of the plurality of selectable symptoms; and
filtering the plurality of destinations by specialties relating to the at least one of the plurality of selectable symptoms.

14. The method of claim 12, wherein the data element comprises at least one of, a drive time, a route distance, a reported wait time, a reported capacity.

15. The method of claim 12, further comprising:
displaying a calendar icon representing an appointment scheduler;
receiving input from a user selecting the calendar icon to initiate the appointment scheduler;
displaying a medical specialties table, configured to present a plurality of selectable medical specialties;
receiving input from the user selecting a medical specialty;
determining nearby medical specialists providing the medical specialty within a predetermined distance to the vehicle;
displaying the nearby medical specialists identified by text and medical iconography of the medical specialty onto the display;
receiving input from the user selecting a medical specialist from the nearby medical specialists;
requesting available appointment dates and times from an appointment server of the medical specialist;
receiving at least one available appointment date and time;
displaying the at least one available appointment date;
receiving input from the user selecting an appointment date;
displaying at least one available appointment time associated with the appointment date;
receiving input from the user selecting an appointment time; and
transmitting the appointment date and the appointment time to the appointment server.

16. The method of claim 12, wherein the one or more in-vehicle modules comprises at least one of an event data recorder (EDR), in-vehicle camera(s), vehicle-to-vehicle (V2V) transmitter or holographic module.

17. The method of claim 12, wherein the emergency report is a traffic accident emergency report comprises, a vehicle data element, a person data element, a crash data element, an event data recorder (EDR) data element, or a camera data element.

18. The method of claim 17, wherein the traffic accident emergency report includes data elements from the one or more in-vehicle modules.

19. The method of claim 17, wherein the person data element comprises a jurisdiction, a jurisdiction name, a driver license number, a license class, a license expiration date, an ISS date, an endorsements, an username, a date of birth, a sex, a height, a weight, an eye color, an address, a city, a zip code, a commercial driver validation, an endorsement, a restriction, a type applicable, a license status, a license plate number, or an insurance provider.

20. The method of claim 12, wherein each icon is dynamically color-coded based further in part on determined changes in traffic patterns.

21. The method of claim 12, further comprising:
displaying, on the display, destination icons, each representing one of plurality of destination types;
receiving input from a user selecting a fuel station as a destination type;
displaying, on the display, type icons, each representing one of a plurality of fuel types; and
receiving input from the user selecting a fuel type.

22. The method of claim 21, wherein the data element containing information relating to a fuel station comprising, a name of the fuel station, estimated time from the fuel station, or computed distance from the fuel station.

23. The method of claim 22, wherein the data element further comprises at least one of fuel price, hydrogen purity, diesel availability, battery charger specifications, certification of station, or quality verification level.

24. One or more non-transitory computer storage media having computer-executable instructions embodied thereon that, when executed by one or more processors, cause the one or more processors to perform a method, the method comprising:
connecting to an external server;
receiving a location of the vehicle;
displaying a vehicle icon positioned on the location of the vehicle in a navigation interface on a display in the vehicle;
receiving an aggregate data file comprising a data element for each of a plurality of destinations, wherein the data element comprises a position of a destination;
retrieving a fuel range of the vehicle from a CAN Bus network of the vehicle;
storing the aggregate data file;
computing distance between the vehicle and each of the plurality of destinations;
displaying icons representing each of the plurality of destinations in the navigation interface on the display, each icon being dynamically color-coded based at least in part on the computed distance relative to the fuel range of the vehicle;
displaying, on the display, icons representing selectable types of destinations;
receiving input from a user selecting a hospital type of destination;
displaying, on the display, a plurality of selectable symptoms in a table;
receiving input from the user selecting at least one of the plurality of selectable symptoms; and
filtering the plurality of destinations by specialties relating to the at least one of the plurality of selectable symptoms.

25. The media of claim 24, wherein each icon is dynamically color-coded based further in part on determined changes in traffic patterns.

26. The media of claim 24, further comprising:
receiving a request for an emergency report;
retrieving the emergency report formatted for emergency data elements based upon an emergency report type;
receiving the emergency data elements from one or more in-vehicle modules;
generating the emergency report based on the emergency report type;
displaying the emergency report with the emergency data elements;
attaching the emergency data elements to the emergency report; and
transmitting the emergency report to the external server.

27. The media of claim 26, wherein the one or more in-vehicle modules comprises at least one of an event data recorder (EDR), in-vehicle camera(s), vehicle-to-vehicle (V2V) transmitter or holographic module.

28. The media of claim 26, wherein the traffic accident emergency report includes data elements from the one or more in-vehicle modules.

\* \* \* \* \*